(12) United States Patent
Ramprashad et al.

(10) Patent No.: US 11,832,077 B2
(45) Date of Patent: Nov. 28, 2023

(54) SPATIAL AUDIO CONTROLLER

(71) Applicant: Apple Inc., Cupertino, CA (US)

(72) Inventors: Sean A. Ramprashad, Los Altos, CA (US); Peter D. Callaway, Stowmarket (GB); Jae Woo Chang, Cupertino, CA (US); Martin E. Johnson, Los Gatos, CA (US); Daniel K. Boothe, San Francisco, CA (US); Kostyantyn Komarov, San Francisco, CA (US); Patrick Miauton, Redwood City, CA (US); Christopher M. Garrido, Santa Clara, CA (US); Austin W. Shyu, San Diego, CA (US); Karthick Santhanam, Campbell, CA (US)

(73) Assignee: Apple Inc., Cupertino, CA (US)

( * ) Notice: Subject to any disclaimer, the term of this patent is extended or adjusted under 35 U.S.C. 154(b) by 239 days.

(21) Appl. No.: 17/339,864

(22) Filed: Jun. 4, 2021

(65) Prior Publication Data
US 2022/0394407 A1    Dec. 8, 2022

(51) Int. Cl.
| | |
|---|---|
| *H04S 3/00* | (2006.01) |
| *H04S 7/00* | (2006.01) |
| *G06F 3/0487* | (2013.01) |
| *H04S 5/00* | (2006.01) |
| *H04R 3/00* | (2006.01) |

(52) U.S. Cl.
CPC ............ *H04S 3/004* (2013.01); *G06F 3/0487* (2013.01); *H04R 3/005* (2013.01); *H04S 5/005* (2013.01); *H04S 7/302* (2013.01); *H04S 2400/01* (2013.01); *H04S 2400/11* (2013.01); *H04S 2420/01* (2013.01)

(58) Field of Classification Search
CPC .......... H04S 3/004; H04S 5/005; H04S 7/302; H04S 2400/01; H04S 2400/11; H04S 2420/01; G06F 3/0487; H04R 3/005
USPC ......................................................... 381/17
See application file for complete search history.

(56) References Cited

U.S. PATENT DOCUMENTS

| | | |
|---|---|---|
| 2015/0124973 A1 | 5/2015 | Arteaga et al. |
| 2015/0189457 A1* | 7/2015 | Donaldson .............. H04M 3/56 381/1 |
| 2022/0103963 A1 | 3/2022 | Satongar et al. |

* cited by examiner

*Primary Examiner* — Paul Kim
(74) *Attorney, Agent, or Firm* — Aikin & Gallant, LLP

(57) ABSTRACT

A method performed a local device that is communicatively coupled with several remote devices, the method includes: receiving, from each remote device with which the local device is engaged in a communication session, an input audio stream; receiving, for each remote device, a set parameters; determining, for each input audio stream, whether the input audio stream is to be 1) rendered individually or 2) rendered as a mix of input audio streams based on the set of parameters; for each input audio stream that is determined to be rendered individually, spatial rendering the input audio stream as an individual virtual sound source that contains only that input audio stream; and for input audio streams that are determined to be rendered as the mix of input audio streams, spatial rendering the mix of input audio streams as a single virtual sound source that contains the mix of input audio streams.

22 Claims, 17 Drawing Sheets

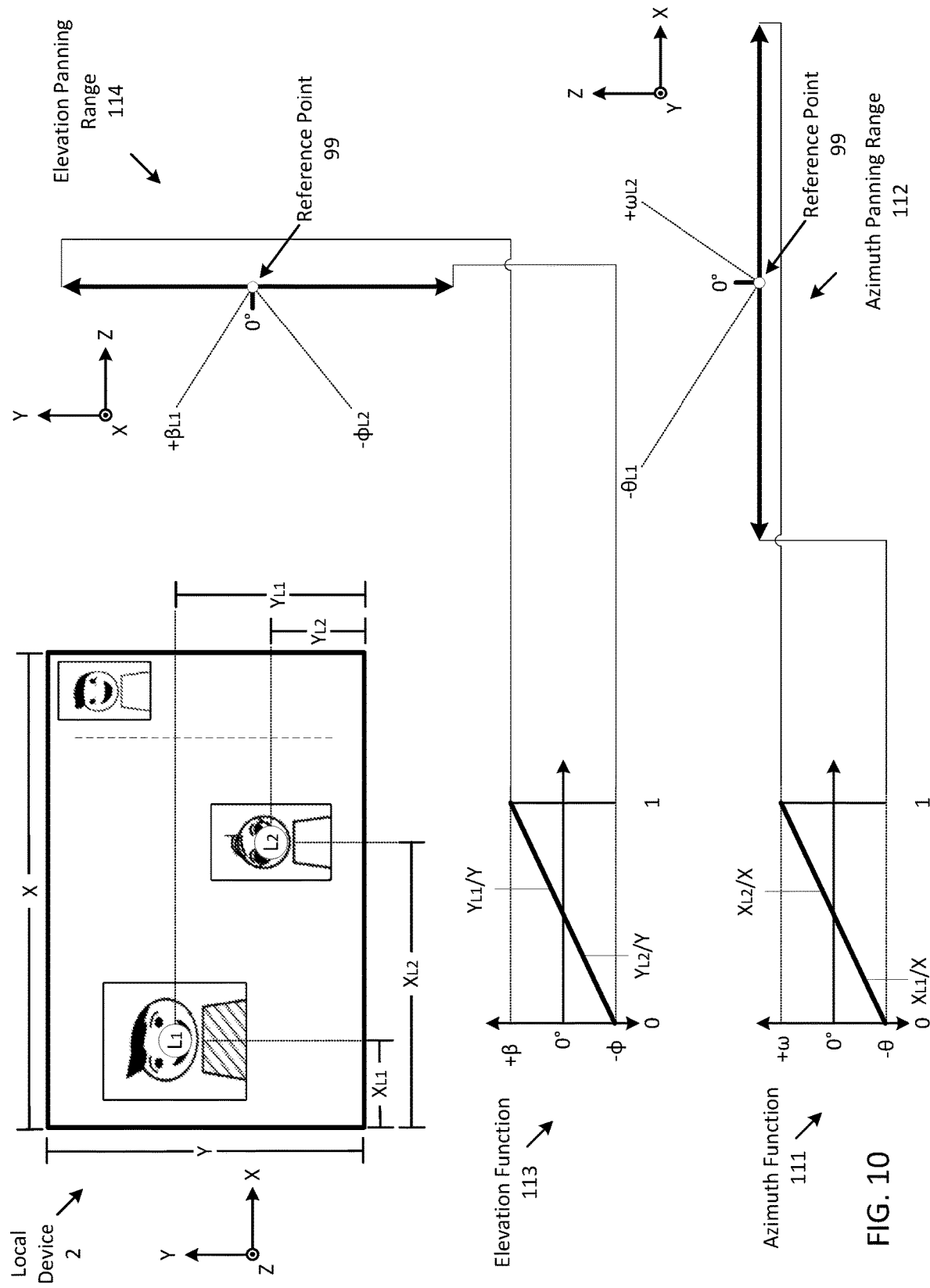

SPATIAL AUDIO CONTROLLER

FIELD

An aspect of the disclosure relates to a system that includes a spatial audio controller that controls how audio is spatialized in communication sessions. Other aspects are also described.

BACKGROUND

Many devices today, such as a smartphone, are capable of various types of telecommunication with other devices. For example, a smartphone may perform a phone call with another device. In which case, when a telephone number is dialed, the smartphone connects to a cellular network, which may then connect the smartphone with another device (e.g., another smart phone or a landline). In addition, the smartphone may also be able to conduct a video conference call in which video data and audio data are exchanged with another device.

SUMMARY

While a local device is engaged in a communication session, such as a video conference call, with several remote devices, the local device may receive video data and audio data of the session from each remote device. The local device may use the video data to display a dynamic video representation of each remote participant, and may use the audio data to create spatialized audio renderings of each remote participant. To do this, the local device may perform spatial rendering operations upon each remote device's audio data, such that the local user perceives each remote participant from a different location. Performing these video processing and audio processing operations, however, takes a heavy processing toll on electronics (e.g., a central processing unit (CPU)) of the local device. Therefore, there is a need for a spatial audio controller that creates and manages audio spatial renderings during a communication session with remote devices, with consideration of both complexity and the video presentation, while preserving audio quality.

To overcome these deficiencies, the present disclosure describes a local device with a spatial audio controller for performing audio signal processing operations to efficiently and effectively spatial render input audio streams from one or more remote devices during a communication session. An aspect of the disclosure is a method performed by an electronic device (e.g., a local device) that is communicatively coupled with one or more remote devices and are engaged in a communication session. While engaged in the session, the local device receives, from each remote device, an input audio stream, and receives a set of communication session parameters for each remote device. For example, the parameters may include one or more voice activity detection (VAD) parameters that is based on a VAD signal received from each remote device that indicates at least one of voice activity and voice strength of a remote participant of a respective remote device. In addition, when the devices are engaged in a video communication session (e.g., video conference call), in which input video streams are received, and visual representations (or tiles) of the video streams are disposed in a graphical user interface (GUI) (window) on a display screen of the local device, the session parameters may indicate how the visual representations are arranged within the GUI (e.g., whether in a larger per-user tile canvas region or a smaller per-user tile roster region), the size of the visual representations, etc. The local device determines, for each input audio stream, whether the input audio stream is to be 1) rendered individually with respect to the other received input audio streams or 2) rendered within a mix of input audio streams with one or more other input audio streams based on the set of communication session parameters. For example, an input audio stream may be individually rendered when at least one of: a VAD parameter, such as voice activity is above a voice activity threshold (e.g., indicating that the remote participant is actively talking), the visual representation associated with the input audio stream is contained within a prominent area of the GUI (e.g., in the canvas region of the GUI), and/or a size of the visual representation (e.g., the size of the representation used to show the video of a remote participant) is above a threshold size. Thus, for each input audio stream that is determined to be rendered individually, the local device spatial renders the input audio stream as an individual virtual sound source that contains only the input audio stream, and for input audio streams that are determined to be rendered as the mix of input audio streams, spatial renders the mix of input audio streams as a single virtual sound source that contains the mix of input audio streams. Therefore, by spatial rendering some input audio streams individually which may be of more importance to the local participant, while spatial rendering a mix of other input audio streams that may not be as critical, the local device may reduce the amount of computational processing that is required to spatial render all of the streams of the communication session.

In one aspect, the local device may determine an arrangement of locations for the individual virtual sound sources in front, behind, or on a side of the display screen of the local device based on the communication session parameters. For instance, for each individual virtual sound source, the local device determines a location within the GUI of the visual representation of a respective input video stream that is associated with a respective input audio stream that is to be spatial rendered as the individual virtual sound source, and determines spatial parameters (e.g., an azimuth angle, an elevation angle, a distance, and even a reverberation level) that indicates a location of the individual virtual sound source within the arrangement (e.g., with respect to a reference point in space) based on the determined location of the visual representation, whereby spatial rendering the input audio stream as the individual virtual sound source may include using the determined spatial parameters to spatial render the input audio stream as the individual virtual sound source at the location. Such a location may also be included with a virtual room model, and spatial parameters include model aspects such as a reverberation level for a reverberation model of the room as a function of distance and/or position in the room. Thus, the local device may be considered to be located within this virtual room. In one aspect, the arrangement also includes a location of the single virtual sound source for a group (e.g., mix) of input audio sources, where determining the location includes using one or more of the locations within the GUI of the visual representation of each of the respective input video streams that are associated with each of the input audio streams of the mix, and/or the levels of each of the input audio streams of the mix, and from this information determining a location as well as the spatial parameters that indicates a location of the virtual (grouped and mixed) sound source of the mixed input audio stream. This group location is also used to determine new spatial parameters. For instance, determining the new spatial parameters includes determining a weighted combination of the spatial location data of all input audio streams of the mix, where the weighting can be a function of the energy level of individual streams. In one aspect, streams selected for grouping in such a joint single location include those for which the visual representation is less prominent (e.g., smaller video tiles than tiles within the prominent region of the GUI) or for which the visual representation is not visible (e.g., currently implicitly off the display screen). Thus, a single grouped audio stream rendered in a spatial sense to a single location may be used when some of the visual representations are less prominent or not visible. Thus, in totality, the virtual sound sources, individual or grouped, may be arranged as a function and in commensurate relationship to the arrangement of visual representations to provide the local user with an optimized spatial experience while controlling complexity and accounting for the most prominent aspects in the video communication session.

According to another aspect of the disclosure, a method is performed by the local device provides another arrangement of virtual sound source locations. For example, the local device receives, from each remote device, an input audio stream and an input video stream, displays the input video streams as visual representations in a GUI on a display screen and spatial renders, at least one input audio stream, to output an individual virtual sound source that only includes the stream. In response to determining that additional remote devices have joined the video communication session, receiving, for each of the additional devices an input audio stream and an input video stream. The local device determines whether the device supports additional individual virtual sound sources for one or more input audio streams of the additional devices. In response to determining that the local device does not support additional individual virtual sound sources, the local device defines several user interface (UI) zones located in the GUI, each UI zone including one or more visual representations of one or more video streams, and, for each UI zone, spatial rendering a mix of one or more input audio streams that are associated with the one or more visual representations that are included within the UI zone.

According to another aspect of the disclosure, a method performed by the local device provides an adjustment to the location of the virtual sound source based on changes to panning ranges (or limits) due to the local device rotating to a different orientation. Specifically, the remote device receives an input audio stream and determines a first orientation of the local device (e.g., a portrait orientation). The local device determines a panning range of several speakers for the first orientation of the local device that spans along a horizontal axis. The local device spatial renders the input audio stream as a virtual sound source at a location along the horizontal axis and within the panning range using the speakers. The local device may also pan jointly in the horizontal direction and vertical direction. Panning limits, or a joint range of horizontal and vertical panning directions, may be determined based on orientation of the device. The orientation of the device may imply how the audio is located relative to horizontal and vertical spans of the device (e.g., the rectangular screen of the device that is viewed by the user). In response to determining that the local device is in a second orientation (e.g., the device having been rotated 90° into a landscape orientation) the local device, determines an adjusted panning range of the speakers that spans wider along the horizontal axis than the original panning range, and adjusts the location of the virtual sound source along the horizontal axis based on the adjusted panning range. Thus, when the local device rotates, the virtual sound source is perceived by a local user as being in a wider position than when the local device was in the previous orientation. In one aspect, the joint horizontal and vertical panning limits may be a function of orientation. Individual or mixed sound sources will have virtual azimuth and elevation angles within that range, where the mapping from the locations of visual representations uses this range to define the function for the mapping.

According to another aspect of the disclosure, a method performed by the local device determines a panning range of several speakers based on an aspect ratio of the GUI (e.g., window displayed on the GUI) of the communication session that is displayed on the display screen. The local device receives an input audio stream and an input video stream, and displays a visual representation of the input video stream within a GUI of the video communication session that is displayed on a display screen (e.g., which may be integrated within the local device, and on which may be a window containing the communication session). The local device determines an aspect ratio of the GUI, and determines an azimuth panning range that is at least a portion of a total azimuth panning range of several speakers and an elevation panning range that is at least a portion of a total elevation panning range of the speakers based on the aspect ratio. The local device spatial renders the input audio stream to output a virtual sound source within the azimuth and elevation panning ranges.

The above summary does not include an exhaustive list of al aspects of the disclosure. It is contemplated that the disclosure includes all systems and methods that can be practiced from all suitable combinations of the various aspects summarized above, as well as those disclosed in the Detailed Description below and particularly pointed out in the claims. Such combinations may have particular advantages not specifically recited in the above summary.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect of this disclosure are not necessarily to the same aspect, and they mean at least one. Also, in the interest of conciseness and reducing the total number of figures, a given figure may be used to illustrate the features of more than one aspect, and not all elements in the figure may be required for a given aspect.

FIG. 10 shows an example of determining spatial parameters by using one or more linear functions to map locations of visual representations to angles at which input audio streams are to be rendered according to one aspect.

DETAILED DESCRIPTION

Several aspects of the disclosure with reference to the appended drawings are now explained. Whenever the shapes, relative positions and other aspects of the parts described in a given aspect are not explicitly defined, the scope of the disclosure here is not limited only to the parts shown, which are meant merely for the purpose of illustration. Also, while numerous details are set forth, it is understood that some aspects may be practiced without these details. In other instances, well-known circuits, structures, and techniques have not been shown in detail so as not to obscure the understanding of this description. Furthermore, unless the meaning is clearly to the contrary, ail ranges set forth herein are deemed to be inclusive of each range's endpoints.

Figure 1:
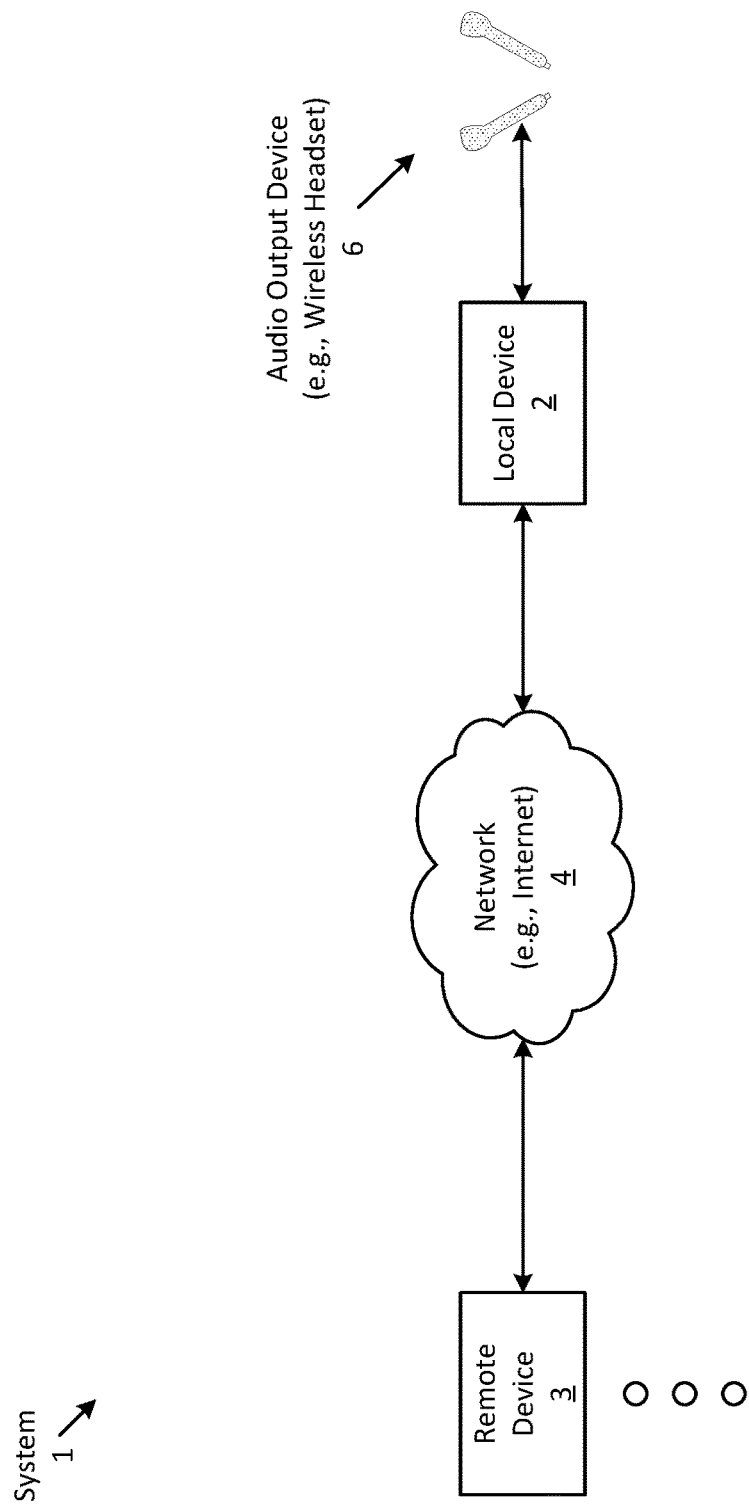
FIG. 1 shows a system that includes one or more remote devices that are engaged in a communication session with a local device that includes a spatial audio controller for spatial rendering audio from the one or more remote devices according to one aspect.

FIG. 1 shows a system 1 that includes one or more remote devices that are engaged in a communication session with a local device that includes a spatial audio controller for spatial rendering audio from the one or more remote devices according to one aspect. As described herein, this may allow the local device to simulate a more realistic listening experience during a (e.g., video) communication session (e.g., a video conference call) with the remote devices for a local user in which audio is perceived by the local user to come from sources of sound in a separate frame of reference, such as the physical environment surrounding or in front of the user, and move from and around the screen if there is a visual representation. The audio system includes a local (or first electronic) device 2, a remote (or second electronic) device 3, a network 4 (e.g., a computer network, such as the Internet), and an audio output device 6. In one aspect, the system may include more or less elements. For instance, the system may have one or more remote devices, where al of the devices are simultaneously engaged in the communication session with the local device, as described herein. In another aspect, the audio system may include one or more remote (electronic) servers that are communicatively coupled with at least some of the devices of the audio system 1, and may be configured to perform at least some of the operations described herein. In another aspect, the system may not include an audio output device. In which case, the local device may perform audio output operations, such as using one or more audio driver signals to drive one or more speakers, which may be integrated within the local device or separate from the local device (e.g., stand-alone speakers that are communicatively coupled with the local device, such as a set of headphones).

In one aspect, the local device (and/or the remote device) may be any electronic device (e.g., with electronic components, such as a processor, memory, etc.) that is capable of engaging in a communication session, such as a video (conference) call. For example, the local device may be a desktop computer, a laptop computer, a digital media player, etc. In one aspect, the device may be a portable electronic device (e.g., being handheld operable), such as a tablet computer, a smart phone, etc. In another aspect, the device may be a head-mounted device, such as smart glasses, or a wearable device, such as a smart watch. In one aspect, the remote device(s) may be the same type of device as the local device (e.g., both devices being smart phones). In another aspect, at least some of the remote devices may be different, such as some being desktop computers, while others are smart phones.

As illustrated, the local device 2 is (e.g., communicatively) coupled to the remote device 3 via the computer network (e.g., Internet) 4. Specifically, the local and remote devices may be configured to establish and engage in a video conference call in which the devices that are engaged within the call exchange audio and video data. For example, the local device may use any signaling protocol (e.g., Session Initiation Protocol (SIP)) to establish a communication session and use any communication protocol (e.g., Transmission Control Protocol (TCP), Real-Time Transport Protocol (RTP), etc.) to exchange audio and video data during the session. For example, when the session is initiated (e.g., by a communication session application that may be executing within the local device), the local device may capture one or more microphone signals (using one or more microphones of the local device), encode the audio data (e.g., using any audio codec), and transmit the audio data (e.g., as IP packets) to one or more remote devices, and receive audio data (e.g., as input audio streams) from each of the remote devices for driving one or more speakers of the local device, via the network.

In addition, the local device may transmit video data (captured by one or more cameras of the device) to each remote device engaged in the call, and may receive video data (as an input video stream) from each remote device. as an output video stream, and receive at least one video signal (or input video stream) for display on one or more display screens. In one aspect, when transmitting video data, the local device may encode the video data using any video codec (e.g., H.264), which may then be decoded and rendered on each of the remote devices to which the local device transmits the encoded data.

In one aspect, the network 4 may be any type of network that enables the local device to be communicatively coupled with one or more remote devices. In another aspect, the network may include a telecommunication network with one or more cell towers, which may be part of a communication network (e.g., a 4G Long Term Evolution (LTE) network) that supports data transmission (and/or voice calls) for electronic devices, such as mobile devices (e.g., smartphones).

In one aspect, the audio output device 6 may be any electronic device that includes at least one speaker and is configured to performing output sound by driving the speaker. For instance, as illustrated, the device is a wireless headset (e.g., in-ear headphones or earbuds) that are designed to be positioned on (or in) a user's ears, and are designed to output sound into the user's ear canal. In some aspects, the earphone may be a sealing type that has a flexible ear tip that serves to acoustically seal off the entrance of the user's ear canal from an ambient environment by blocking or occluding in the ear canal. As shown, the output device includes a left earphone for the user's left ear and a right earphone for the user's right ear. In this case, each earphone may be configured to output at least one audio channel of media content (e.g., the right earphone outputting a right audio channel and the left earphone outputting a left audio channel of a two-channel input of a stereophonic recording, such as a musical work). In another aspect, the output device may be any electronic device that includes at least one speaker and is arranged to be worn by the user and arranged to output sound by driving the speaker with an audio signal. As another example, the output device may be any type of headset, such as an over-the-ear (or on-the-ear) headset that at least partially covers the user's ears and is arranged to direct sound into the ears of the user.

In some aspects, the audio output device may be a head-worn device, as illustrated herein. In another aspect, the audio output device may be any electronic device that is arranged to output sound into an ambient environment. Examples may include a stand-alone speaker, a smart speaker, a home theater system, or an infotainment system that is integrated within a vehicle.

In one aspect, the audio output device 6 may be a wireless device that may be communicatively coupled to the local device in order to exchange audio data. For instance, the local device may be configured to establish the wireless connection with the audio output device via a wireless communication protocol (e.g., BLUETOOTH protocol or any other wireless communication protocol). During the established wireless connection, the local device may exchange (e.g., transmit and receive) data packets (e.g., Internet Protocol (IP) packets) with the audio output device, which may include audio digital data in any audio format. In particular, the local device may be configured to establish and communicate with the audio output device over a bi-directional wireless audio connection (e.g., which allows both devices to exchange audio data), for example to conduct a hands-free call or to use voice commands. Examples of a bi-directional wireless communication protocol include, without limitation the Hands-Free Profile (HFP) and the Headset Profile (HSP), both of which are BLUETOOTH communication protocols. In another aspect, the local device may be configured to establish and communication with the output device over a uni-directional wireless audio connection, such as (e.g., Advanced Audio Distribution Profile (A2DP) protocol), which allows the local device to transmit audio data to one or more audio output devices.

In another aspect, the local device 2 may communicatively couple with the audio output device 6 via other methods. For example, both devices may couple via a wired connection. In this case, one end of the wired connection may be (e.g., fixedly) connected to the audio output device, while another end may have a connector, such as a media jack or a universal serial bus (USB) connector, which plugs into a socket of the audio source device. Once connected, the local device may be configured to drive one or more speakers of the audio output device with one or more audio signals, via the wired connection. For instance, the local device may transmit the audio signals as digital audio (e.g., PCM digital audio). In another aspect, the audio may be transmitted in analog format.

In some aspects, the local device 2 and the audio output device 6 may be distinct (separate) electronic devices, as shown herein. In another aspect, the local device may be a part of (or integrated with) the audio output device. For example, as described herein, at least some of the components of the local device (such as a controller) may be part of the audio output device, and/or at least some of the components of the audio output device may be part of the local device. In this case, each of the devices may be communicatively coupled via traces that are a part of one or more printed circuit boards (PCBs) within the audio output device.

Figure 2:
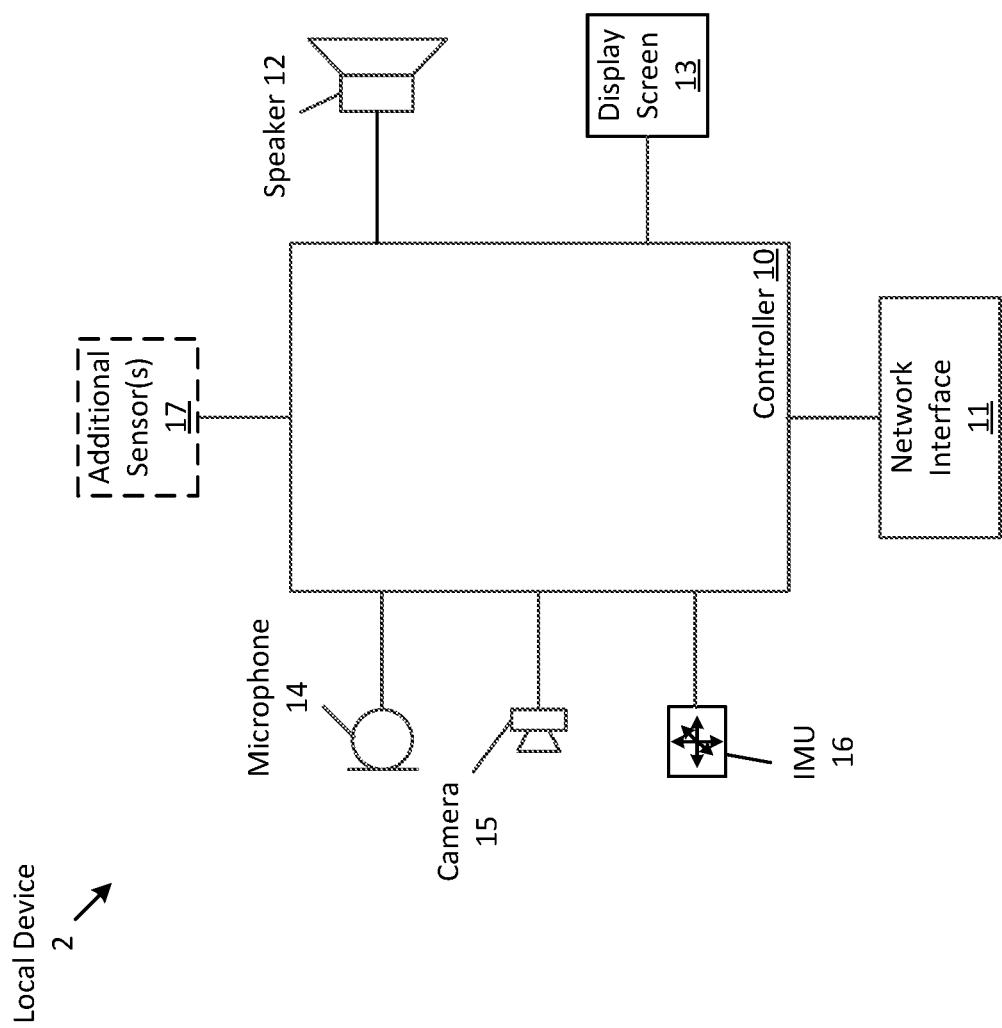
FIG. 2 shows a block diagram of the local device 2 that spatial renders input audio streams from remote devices with which the local device is engaged in a communication session to output virtual sound sources according to one aspect.

FIG. 2 shows a block diagram of the local device 2 that spatial renders input audio streams from remote devices with which the local device is engaged in a communication session to output virtual sound sources according to one aspect. The local device 2 includes a controller 10, a network interface 11, a speaker 12, a microphone 14, a camera 15, a display screen 13, an inertial measurement unit (IMU) 16, and (optionally) one or more additional sensors 17. In one aspect, the local device may include more or less elements as described herein. For instance, the device may include two or more of at least some of the elements, such as having two or more speakers, two or more microphones, two or more cameras, and two or more display screens.

The controller 10 may be a special-purpose processor such as an application-specific integrated circuit (ASIC), a general purpose microprocessor, a field-programmable gate array (FPGA), a digital signal controller, or a set of hardware logic structures (e.g., filters, arithmetic logic units, and dedicated state machines). The controller is configured to perform audio signal processing operations and/or networking operations. For instance, the controller 10 may be configured to engage in a video communication session with one or more remote devices, via the network interface 11. In another aspect, the controller may be configured to perform audio signal processing operations upon audio data (e.g., input audio streams) associated with an engaged communication session, such as spatial rendering the streams to output them as virtual sound sources to provide a more realistic listening experience for the local user. More about the operations performed by the controller 10 is described herein.

In one aspect, the one or more sensors 17 are configured to detect the environment (e.g., in which the local device is located) and produce sensor data based on the environment. In some aspects, the controller may be configured to perform operations based on the sensor data produced by one or more sensors 17. For instance, the sensors may include a (e.g., optical) proximity sensor that is designed to produce sensor data that indicates an object is at a particular distance from the sensor (or the local device), such as detecting a viewing distance between the local device and the local user. The sensors may also include an accelerometer that is arranged and configured to receive (detect or sense) vibrations (e.g., speech vibrations that are produced while the user speakers), and produce an accelerometer signal that represents (or contains) the vibrations. The IMU is designed to measure the position and/or orientation of the local device. For instance, the IMU may produce sensor data that indicates a change in orientation (e.g., about any X, Y, Z-axes) of the local device and/or a change in the position of the device.

The speaker 12 may be an electrodynamic driver that may be specifically designed for sound output at certain frequency bands, such as a woofer, tweeter, or midrange driver, for example. In one aspect, the speaker 12 may be a "full-range" (or "full-band") electrodynamic driver that reproduces as much of an audible frequency range as possible. The microphone 14 may be any type of microphone (e.g., a differential pressure gradient micro-electro-mechanical system (MEMS) microphone) that is configured to convert acoustical energy caused by sound wave propagating in an acoustic environment into an input microphone signal (or audio signal).

In one aspect, the camera 15 is a complementary metal-oxide-semiconductor (CMOS) image sensor that is capable of capturing digital images including image data that represent a field of view of the camera 15, where the field of view includes a scene of an environment in which the local device 2 is located. In some aspects, the camera may be a charged-coupled device (CCD) camera type. The camera is configured to capture still digital images and/or video that is represented by a series of digital images. In one aspect, the camera may be positioned anywhere about the local device. In some aspects, the device may include multiple cameras (e.g., where each camera may have a different field of view).

The display screen 13 is designed to present (or display) digital images or videos of video (or image) data. In one aspect, the display screen may use liquid crystal display (LCD) technology, light emitting polymer display (LPD) technology, or light emitting diode (LED) technology, although other display technologies may be used in other aspects. In some aspects, the display may be a touch-sensitive display screen that is configured to sense user input as input signals. In some aspects, the display may use any touch sensing technologies, including but not limited to capacitive, resistive, infrared, and surface acoustic wave technologies.

In one aspect, any of the elements described herein may be a part of (or integrated into) the local device (e.g., integrated into a housing of the local device). In another aspect, at least some of the elements may be separate electronic devices that rea communicatively coupled (e.g., via a BLUETOOTH connection) with the (e.g., controller via the network interface of the) local device. For instance, the speaker(s) may be integrated into another electronic device that is configured to receive audio data from the local device for driving the speaker(s). As another example, the display screen 13 may be integrated with the local device, or the display screen may be a separate electronic device (e.g., a monitor) that is communicatively coupled with the local device.

In one aspect, controller 10 is configured to perform audio signal processing operations and/or networking operations, as described herein. For instance, the controller may be configured to engage in a communication session with one or more remote devices and obtain (or receive) audid/video data from the remote devices. The controller is configured to output (display) the video data on the display screen and spatial render the audio data. More about spatial rendering audio data is described herein. In one aspect, operations performed by the controller may be implemented in software (e.g., as instructions stored in memory and executed by the controller) and/or may be implemented by hardware logic structures as described herein.

In one aspect, the controller 10 may be configured to perform (additional) audio signal processing operations based on elements that are coupled to the controller. For instance, when the output device includes two or more "extra-aural" speakers, which are arranged to output sound into the acoustic environment rather than speakers that are arranged to output sound into a user's ear (e.g., as speakers of an in-ear headphone), the controller may include a sound-output beamformer that is configured to produce speaker driver signals which when driving the two or more speakers produce spatially selective sound output. Thus, when used to drive the speakers, the output device may produce directional beam patterns that may be directed to locations within the environment.

In some aspects, the controller 10 may include a sound-pickup beamformer that can be configured to process the audio (or microphone) signals produced two or more external microphones of the output device to form directional beam patterns (as one or more audio signals) for spatially selective sound pickup in certain directions, so as to be more sensitive to one or more sound source locations. In some aspects, the controller may perform audio processing operations upon the audio signals that contain the directional beam patterns (e.g., perform spectrally shaping).

Figure 3:
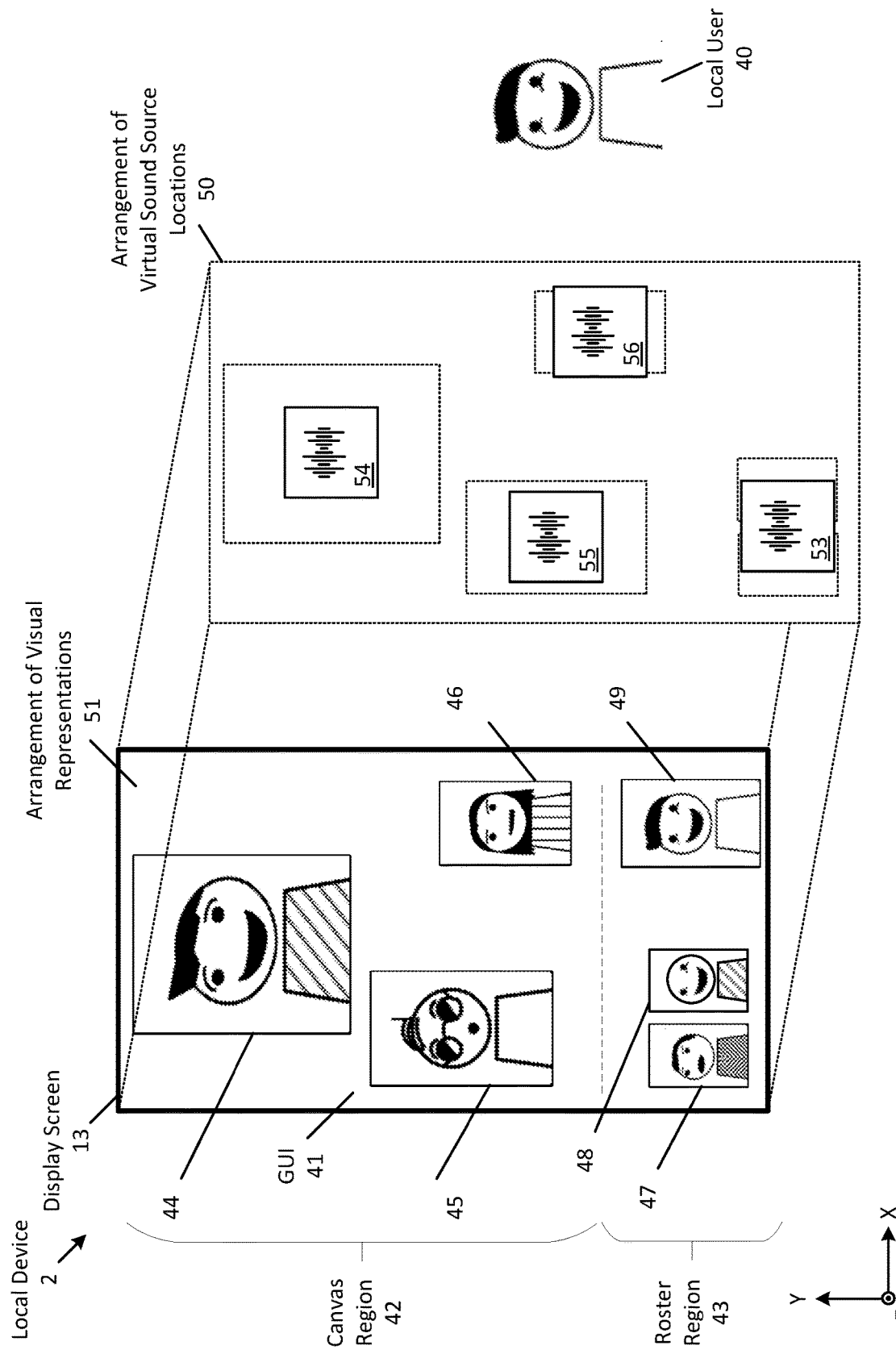
FIG. 3 illustrates an example graphical user interface (GUI) of a communication session that is being displayed by the local device and an arrangement of virtual sound locations of spatial audio being output by the local device during the communication session according to one aspect.

FIG. 3 illustrates an example graphical user interface (GUI) (or GUI window) of a communication session that is being displayed by the local device and an arrangement of virtual sound locations of spatial audio being output by the local device during the communication session according to one aspect. Specifically, this figure illustrates a GUI 41 of a communication session that is being displayed on the display screen 13 of the local device, and shows an arrangement of virtual sound source locations 50, at which spatial audio associated with one or more remote (participants of remote) devices are located and perceived by the local user 40. The GUI 41 includes an arrangement of visual (or video) representations (or tiles) 51, five of which 44-48 are each associated with a different remote participant and one tile 49 that is associated with the local user 40. In particular, each remote participant's visual representation displays an input video stream that is received from each respective participant's remote device that is engaged in the communication session with the local device. In one aspect, at least some of the representations may be dynamic, in which active video is displayed during (at least part of) the length of the communication session. In another aspect, one or more visual representations may display a static image (e.g., of the remote participant). Visual representation 49 displays video data of the local user 40 that may be captured by camera 15

(and transmitted to at least some of the remote devices for display on their respective devices during the communication session).

As shown, the GUI is separated into two regions: a canvas (or primary) region 42 and a roster (or secondary) region 43. The canvas region includes three visual representations, 44-46, and the roster region includes two visual representations 47 and 48. As in the illustration, visual representations within the canvas region may be larger visually than in the roster region, where remote participants with the most prominent speech activity (e.g., with respect to other remote participants who are engaged in the session) are positioned within the canvas region. As described herein, remote participants may be moved between regions, such as, for example, remote participants may be moved from the roster region into the canvas region adaptively based on speech activity. As described herein, the local device may spatial render audio data differently based on which region the visual representation is located. For example, the local device may individually spatial render audio data associated with remote participants in the canvas region, while in contrast audio data associated with remote participants in the roster region may be mixed and then the mix may be spatial rendered as one virtual sound source. More about spatial rendering and the regions of the GUI are described herein.

In traditional (video) communication sessions between multiple remote participants and a local user of the local device 2, audio from all remote participants is perceived to be originating from the same location relative to the local user (e.g., as if the remote participants were all directly speaking over each other from the same point in space). Such an interaction leads to many interruptions as it is difficult for the local user to follow conversations when more than one remote participant speaks at a time. In addition, maintaining eye contact or following the conversation from between different remote participants within the different regions in the GUI is difficult if audio from all remote participants come from the same point in space (or rather as perceived by the local user), which may have no relationship as to where the remote participant is positioned visually. To overcome this, the local device spatial renders audio data received from the remote devices differently, such that sound of at least some of the remote participants is originating from different locations (in space) with respect to the local user 40. Specifically, this figure shows an arrangement of virtual sound source locations 50, where the local device is individually spatial rendering audio data from remote participants associated with visual representations 44-46 as individual virtual sound sources 54-56, respectively, and is spatial rendering audio data from one or more remote devices associated with representations 47 and 48 as a single virtual sound source 53 that includes a mix of audio received from those devices. In one aspect, the arrangement of the virtual sound source locations may be similar to the arrangement of visual representations in order to give the local user the impression that speech from remote participants originate from the same general location as their respective visual representations on the screen, as shown. For example, as illustrated, the individual virtual sound sources are arranged on top of (or positioned on top of) their respective visual representations, while the single virtual sound source 53 of the roster visual representations 47 and 48 is centered between the visual representations. Thus, during the communication session, when the remote participant 44 speaks, the local user will perceive the remote participant's speech as originating from (or above) the participant's visual representation. In another aspect, the arrangement of virtual sound source locations may be different. For instance, the arrangement may be similar to the arrangement of visual representations, but proportionally larger, thus although speech does not originate on each relative visual representation, it may originate from the general location. This can have advantages if the screen is small or if the user chooses to minimize the size of the GUI. In both cases, a larger more natural acoustic spatial representation can be more comfortable and useful to the local user. More about how audio data of the remote participants is spatial rendered is described herein.

As shown in this figure, the local user is engaged in a communication session with five remote participants. In one aspect, the more remote participants may join the communication session, in which case they (or rather their associated visual representations) may be placed within the canvas region or the roster region. With more remote participants being placed within the canvas region, the local device performs additional spatial rendering, which may require more resources and computational processing. This additional processing may take a heavy toll on electronics, such as controller 10. Therefore, as described herein, the controller 10 performs spatial rendering operations that manage audio spatial renderings during a communication session with remote devices. More about these operations is described herein.

Figure 4:
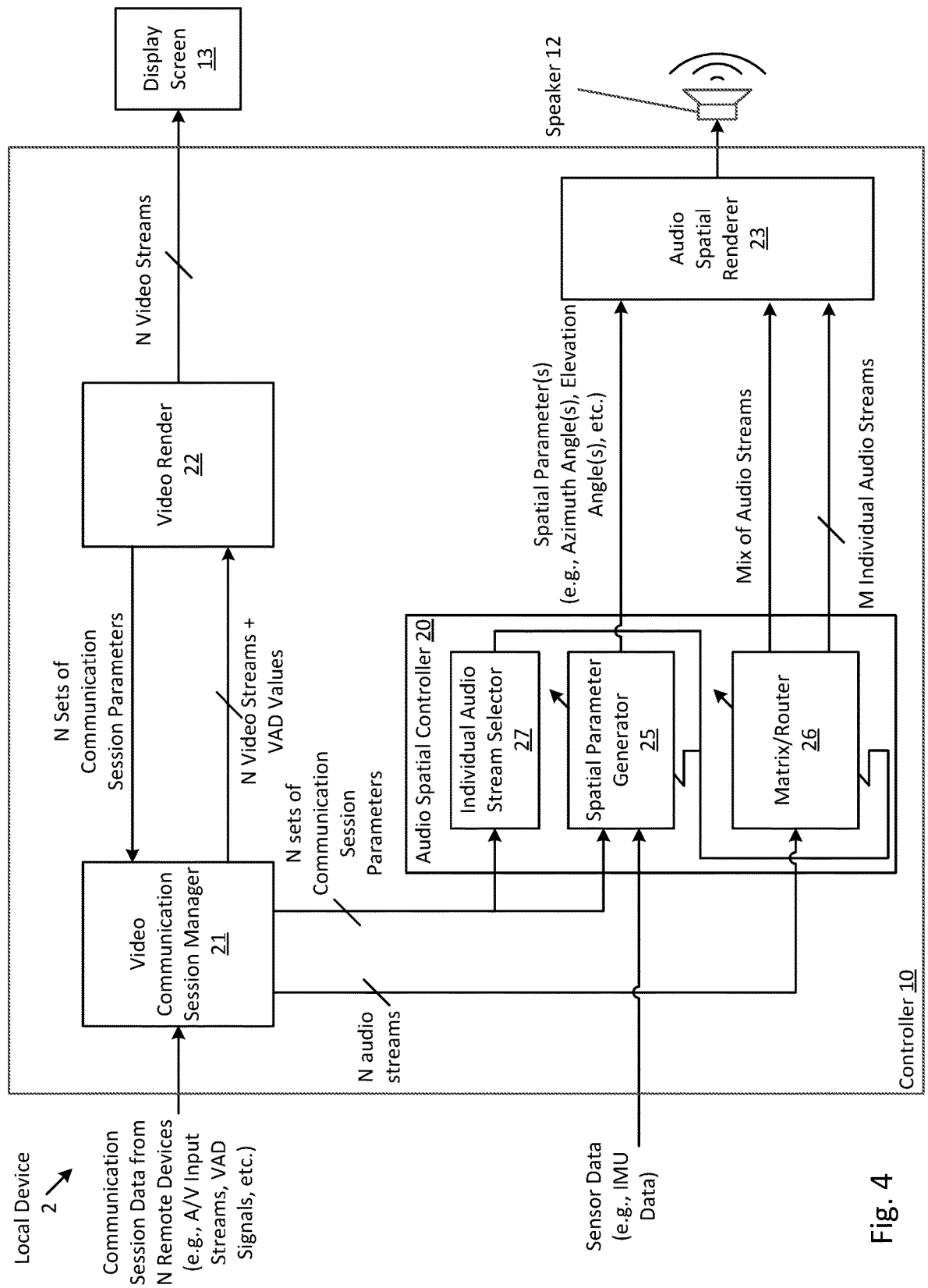
FIG. 4 shows a block diagram of the local device that includes the audio spatial controller that performs spatial rendering operations during a communication session according to one aspect.

FIG. 4 shows a block diagram of the local device 2 that includes the audio spatial controller that performs spatial rendering operations during a communication session according to one aspect. Specifically, this figure shows that the controller 10 has several operational blocks for performing audio signal processing operations to spatial render input audio streams from one or more remote devices that are engaged with the local device in a communication session. As shown, the controller includes an audio spatial controller 20, a video communication session manager 21, a video renderer 22, and an audio spatial renderer 23.

The video communication session manager 21 is configured to initiate (and conduct) a communication session between the local device 2 (e.g., via network interface 11) and one or more remote devices 3. For example, the session manager may be a part (or receive instructions from) a communication session application (e.g., a telephony application) that is being executed by (e.g., the controller 10 of the) local device 2. For instance, the application may display a GUI on the display screen 13 of the local device, which may provide the local user 40 the ability to initiate the session (e.g., using a simulated keypad, a contacts list, etc.). Once the GUI receives user input (e.g., dialing of a remote user's telephone number using the keypad), the session manager 21 may communicate with the network 4 to establish the communication session, as described herein.

Once initiated, the video communication session manager 21 may receive communication session data from each ("N") remote devices with which the local device is engaged in the communication session. In one aspect, the received data may include, from each remote device, an input audio stream that includes audio data of a respective remote participant (e.g., captured by one or more microphones of the remote device) and an input video stream that includes video data of the respective remote participant (e.g., captured by one or more cameras of the remote device). Thus, the session manager may receive N input audio streams and N input video streams. In one aspect, the session manager may assign each input audio stream to a particular input audio channel of a predefined number of input audio channels. In one aspect, an assigned channel may remain assigned to a particular input audio stream (e.g., remote device) for a duration of a communication session. In one aspect, the session manager may dynamically assign input audio channels to remote participants as they join the communication session. In one aspect, the manager may receive more or less of the streams (e.g., the manager may receive only an audio stream when a remote device has deactivated its camera).

In one aspect, the session manager 21 may receive one or more audio signals from each remote device. For example, an input audio stream may be one audio channel (e.g., a mono audio signal). In another aspect, an input audio stream may include two or more audio channels, such as a stereophonic recording or an audio recording in a multi-channel format, such as a 5.1-surround format.

In one aspect, the session data may include additional data from at least some of the N remote devices, such as a voice activity detection (VAD) signal. For example, a remote device may produce a VAD signal (e.g., using a microphone signal captured by the remote device), which indicates whether or not speech is contained within the remote device's respective input audio stream. For example, the VAD signal may have a high signal level (e.g., of one) when the presence of speech is detected, and may have a low signal level (e.g., of zero) when speech is not detected (or at least not detected within a threshold level). In another aspect, the VAD signal need not be a binary decision (speech/non-speech); it could instead be a speech presence probability. In some aspects, the VAD signal may also indicate the signal energy level (e.g., sound pressure level (SPL)) of the detected speech.

In one aspect, the video communication session manager 21 may be configured to transmit data (e.g., audio data, video data, a VAD signal, etc.) to one or more of the N remote devices. For example, the manager may receive a microphone signal produced by microphone 14 (which may include speech of the local user 4), and may receive video data produced by the camera 15. Once received, the session manager 21 may distribute the data to at least some of the N remote devices.

The video communication session manager 21 is configured to transmit the N video streams and, for each video stream, one or more VAD values (or parameters) based on the VAD signal to the video renderer 22. For instance, each (or at least one) video stream may be associated with one or more VAD parameters that indicate voice activity of a remote participant within an input audio stream associated with the input video stream (e.g., the value may be a zero or 1, as described herein). In one aspect, manager may transmit a VAD parameter that may indicate a duration at which a remote participant has been speaking. In particular, the VAD parameter may indicate a duration of time that a remote participant has been currently speaking (e.g., the duration of time may correspond to a duration since the VAD value went from zero to 1). In another aspect, a VAD parameter may indicate a total time during the entire duration of the session that a remote participant has spoken (e.g., twenty minutes of a thirty-minute communication session). In another aspect, a VAD parameter may indicate a voice strength (e.g., a signal energy level) of the remote participant (e.g., in SPL). In another aspect, the session manager may transmit the (original) VAD signals received from the remote devices to the video renderer.

The video renderer is configured to render the input video streams as an arrangement of visual representations (such as the arrangement 51 illustrated in FIG. 3). In one aspect, the renderer is configured to arrange the visual representations based on one or more VAD parameters received from the session manager 21. For example, referring to FIG. 3, the renderer may position (visual representations of the) remote participants 44-48 in their respective regions based on their respective voice activity and/or voice strength. For example, the renderer may position visual representations within the canvas region when voice activity is above (or equal to) a voice activity threshold (e.g., equaling one), which may indicate that the remote participant is actively speaking. If, however, the voice activity is below the threshold, the renderer may position the remote participant's visual representations in the roster region. In addition, the renderer may position visual representations within the canvas region 42 in a particular order based on voice activity and/or voice strength. For example, remote participants who speak frequently (and/or who are speaking currently) may be positioned higher in the arrangement. For example, remote participant 44, may be currently speaking and/or may have spoken during most (e.g., above a threshold) of the communication session. In contrast, remote participants who are speaking less frequently may be positioned closer to the roster region 43 (e.g., visual representation 46), and those who speak much more irregularly (e.g., below the threshold), may be positioned in the roster region. In another aspect, remote participants who have a high voice strength (e.g., having a signal energy level above a threshold), may be positioned higher than those who do not.

Along with positioning the visual representations (e.g., based on the VAD parameters), the renderer may define the size of the representations based on one or more criteria. Specifically, one or more similar criteria mentioned above relating to the location of visual representations may apply to the size of the visual representations. For example, remote participants who speak longer and more frequently during the communication session (than other participants), may have a larger visual representation than those two speak less (e.g., remote participant 44 may speak more often than participants 45 and 46). In another aspect, the size of the visual representation may be based on voice strength. For instance, as remote participant's speak louder (e.g., above a signal threshold), the renderer may increase the size of the participant's representation. In another aspect, the size (and/or location) may be based on a signal-to-noise ratio (SNR) of the remote participant's input audio stream, whereby a representation of a participant with a higher SNR may by larger than a size of a representation with a lower SNR (e.g., below a threshold). In one aspect, representations may appear larger and be positioned higher in order to provide the local user a visual sense of who should be given more attention during the communication session. In other aspects, the (e.g., vertical) position within the canvas region may be based on the size of the representation. For instance, the largest (with more respective surface area) representation 44 is positioned above representation 45, which is larger than representation 46.

In one aspect, the renderer 22 may position representations within the roster based on any of the criteria described herein being below one or more respective thresholds. For example, remote participants may be positioned in the roster region when voice activity is infrequent and for short periods of time. In some aspects, the decisions of where to position remote participants and their size may also be based on voice strength. For instance, remote participants with high strength (e.g., with energy levels above a threshold), may be positioned within the canvas region and/or may have representation sizes that are larger than remote participants with lower voice strength, as described herein. In one aspect, visual representations within the roster region may all have a same size, as illustrated in FIG. 3.

In one aspect, the rendering operations performed by the renderer 22 may be dynamic throughout the communication session. For example, the renderer may continuously and dynamically rearrange and/or resize the visual representations based on changes in one or more VAD parameters. As an example, the location of visual representation 44 may change (e.g., lowered along the arrangement) and/or its size may be changed (e.g., the size reduced) within the canvas region as the remote participant speaks less. The renderer may ultimately place this visual representation within the roster if voice activity drops (e.g., below the voice activity threshold) for a period of time. Conversely, the renderer may adjust the location of one or more roster representations based on the criteria mentioned herein. For instance, as the remote participant associated with representation 47 begins to speak more often, the renderer may move the representation into the canvas region. In one aspect, this determination may be based on whether the VAD parameters indicate that the remote participant has spoken for a period of (e.g., continuous) time.

In one aspect, by moving visual representations into and out of both regions, the renderer may adjust the arrangement as needed. For example, if the renderer were to move representation 47 into the canvas region, the canvas representations may be moved about the canvas region in order to accommodate the addition. Specifically, the renderer may spread the representations out evenly within the canvas region. In another aspect, renderer may arrange the representations so that none overlap one another. In some aspects, the renderer may adjust the arrangement of visual representations 51 as additional remote participants join the communication session, adding their respective visual representations to either the canvas region 42 or the roster region 43, accordingly to the criteria mentioned herein. The renderer 22 transmits the N video streams to the display screen 13 for display in the GUI 41, as describe herein.

In one aspect, the renderer is configured to produce N sets of communication session parameters, one set of parameters for each (input audio stream received from a respective) remote device, based on the criteria mentioned herein. For example, the set of communication session parameters may: 1) indicate a size of the GUI (e.g., the orientation of the GUI and/or the size with respect to the display screen), 2) indicate a location (e.g., X, Y-coordinates) of the visual representations, 3) indicate a size of a visual representation of a respective input video stream in the GUI, and 4) may include one or more of the VAD parameters, described herein. In one aspect, the location indicated by the parameters may be a particular location within a visual representation. For instance, the location may be a center point of the visual representation. In another aspect, the location may be based on the video displayed within the visual representation. For instance, the location may be a particular part of the remote participant that is displayed within the visual representation, such as the remote participant's mouth. In one aspect, to determine the location, the renderer may perform an object recognition algorithm to identify the mouth of the remote participant.

In one aspect, the location of the visual representation may be with respect to the size of the GUI and/or may be with respect to the display screen of the local device. As another example, the coordinates may be with respect to a component of the local device, such as when the local device is a multi-media handheld device (e.g., a smart phone), the coordinates may be based on dimensions of a housing of the device or may be based on a display screen size that is displaying the GUI. In which case, the parameters may also include boundary conditions of the GUI and/or the component (e.g., a width of the GUI (in the X-direction) and a height of the GUI (in the Y-direction)). In one aspect, the renderer may translate one or more of the VAD parameters into another domain such to produce a prominence value, which is a rank ordering from most prominent "1" to least prominent "N" of the audio streams. Thus, in FIG. 3, each of the visual representations 44-48 would be assigned a prominent value between 1 to 5. In one aspect, the prominence value may correspond to the position and/or size of the visual representations within the GUI (e.g., the visual representation having a higher prominence value than the other visual representations).

The renderer 22 transmits the N sets of communication session parameters to the video communication session manager 21, which transmits the N sets of parameters and the N input audio streams that are associated with the parameters to the audio spatial controller 20. In one aspect, the video renderer may transmit the sets of communication session parameters directly to the audio spatial controller. The audio spatial controller is configured to receive the parameters and the input audio streams, and is configured to perform one or more audio signal processing operations to spatial render at least some of the input audio streams according to the communication session parameters. As described herein, spatial rendering audio streams may require a significant amount of processing power. When the local user is engaged in a communication session with a small number of remote participants, the audio spatial controller 20 may have the resources to individually spatial render audio data from each of the remote participants. As the number of remote participants grows, however, the controller may be unable to process all of the data as individual virtual sound sources. Therefore, the controller is configured to determine, for each input audio stream, whether the input audio stream is to be 1) rendered individually with respect to the other received input audio streams or 2) rendered as a mix of input audio streams with one or more other input audio streams based on the set of communication session parameters. Once determined, audio spatial controller may be configured to determine how to spatial render (e.g., where to output virtual sound sources of) input audio streams. As a result, the audio spatial controller may manage output of input audio streams, ensuring that there are enough computational resources.

The audio spatial controller 20 includes an individual audio stream selector 27, a spatial parameter generator 25, and a matrix/router 26. The selector is configured to select one or more of the N input audio streams to be individually rendered and to select one or more of the remaining N input audio streams to be rendered as a mix. In one aspect, the audio spatial renderer 23 may be configured to spatial render a limited number of output audio channels as virtual sound sources (e.g., due to resource limitations, as described herein). When the audio spatial controller spatial renders input audio streams, the controller may assign one or more input audio streams to one of the output audio channel of which the audio spatial renderer renders as a virtual sound source. With a limited number of output audio channels, the controller may therefore be limited to output a predefined number of virtual sound sources, since the number of virtual sound sources may be limited to the number of output audio channels. In one aspect, the predefined number is between three to six output audio channels. Thus, of the input audio streams, the selector may only select a number of input audio streams for individual spatial rendering that is equal to or less than the predefined number. In some aspects, one of the predefined number of output audio channels may be reserved for spatial rendering the mix of input audio streams for remote participants of the roster region 43. More about spatial rendering the input audio streams is described herein.

In one aspect, the selector 27 is configured to determine which of the N input audio streams are to be individually spatial rendered (e.g., as M individual audio streams, which is less than or equal to the N audio streams) and/or rendered as the mix based on the N sets of communication session parameters received from the session manager 21. For example, the selector may determine whether an input audio stream is to be individually rendered based on the voice activity, voice strength, and/or a prominence value indicated by (or determined from) one or more VAD values of a remote participant. Specifically, the selector may determine that an input audio stream is to be rendered individually when the voice activity is above the threshold (e.g., indicating that the remote participant is currently and/or regularly speaks during the communication session). In some aspects, where rank ordering into a prominence value is available, the selector may pick the top "M" streams as those to be spatial rendered individually. In one aspect, M streams is less than or equal to the predefined number of audio output channels that are available for spatial rendering as a virtual sound source, as described herein.

In another aspect, the selector may determine whether an input audio stream is to be individually rendered based on characteristics of a visual representations of an input video stream that is associated with the input audio stream (e.g., containing video of the remote participant) that is displayed in the GUI, such as the location and size of the representation. For example, the selector may determine that the input audio stream is to be rendered individually when the location of the visual representation is within the canvas region of the GUI. As another example, the selector may determine that the input audio stream is to be rendered individually when the size of the visual representation is above a threshold size (e.g., greater than a size of all or some of the representations displayed within the roster region). In one aspect, the selector may determine whether an input audio stream is to be rendered as the mix based on the same criteria. For instance, the selector may determine that the input audio stream is to be rendered as the mix when an associated visual representation has a size below the threshold size, is located within the roster, and/or has a voice activity that is below the threshold. In one aspect, the determination made by the selector may be based on one or more criteria. For example, the selector may determine that an input audio stream is to be rendered individually when one or more of the criteria mentioned herein is satisfied.

The spatial parameter generator 25 is configured to receive the N sets of communication session parameters from the session manager 21 and is configured to determine an arrangement of locations for individual virtual sound sources (e.g., the arrangement 50 of FIG. 3) for input audio streams that are to be rendered individually and/or a location of one or more single virtual sound sources, each having a mix of one or more input audio streams that are not to be rendered individually within the physical environment (e.g., with respect to the local user 40) based on the communication session parameters. In one aspect, the arrangement of virtual sound source locations that are to be rendered by the local device may be the same (or similar) as the arrangement of visual representations. For example, referring to FIG. 3, the arrangement of virtual sound source locations 50 map (e.g., approximately) to the arrangement of visual representations, such that source 54 is perceived by the local user 40 as originating from remote participant 44. In another aspect, the arrangement of sound source locations may be different. For example, the virtual locations may have the same arrangement as the visual representations, but may be proportionally larger or smaller. By making the arrangement of sound sources proportional, or commensurate in a relative though not exact sense, has advantages, as described herein. It another aspect, such an arrangement is beneficial in instances in which the positions of the visual representations relative to the local user is not fixed or cannot be determined. Thus, referring to FIG. 3, when rendered by the local device, instead of the local user perceiving the individual virtual sources at the (or about) the same location as respective visual representations, the locations may be wider and taller than the GUI when made proportionally larger.

In another aspect, the arrangement of virtual sound source locations 50 may not be similar to that of the visual representations. For example, rather than the virtual sound sources being spread about a two-dimensional (2D) XY-plane, the virtual sound sources may be spread along one axis (e.g., along a vertical axis. In another aspect, although illustrated as being spread a 2D plane, the virtual sound sources may be a part of a three-dimensional (3D) sound field, in which virtual sound sources appear to originate from various distances from the local user. More about producing a 3D sound field is described herein.

In one aspect, the generator determines, for each input audio stream, using a respective set of communication session parameters, one or more spatial parameters (or spatial data) that indicates spatial characteristics for spatial rendering the input audio stream as a virtual sound source. For instance, the spatial parameters may include a location of the virtual sound source within the arrangement of virtual sound source locations based on the determined location of the visual representation. Specifically, the spatial parameters may map the virtual sound sources on (above, behind, or adjacent to) their respective visual representations. For example, the spatial parameters may indicate that the location of a virtual sound source be positioned on its corresponding visual representation, such that sound of remote participant is perceived by the local user to originate from the participant's visual representation.

In one aspect, the spatial parameters that indicate the location of the virtual sound source may be with respect to a (e.g., predefined) reference point, which may be in front of the display screen 13 of the local device. In some aspects, the reference point is a predetermined viewing location (e.g., where the local user's head is positioned) within the physical environment, while looking at the display screen 13. In another aspect, the reference point may be determined by the spatial parameter generator. For example, the generator may use sensor data to determine the location of the local user, such as proximity sensor data produced by one or more proximity sensors. In another aspect, the generator may receive user input (e.g., via a GUI displayed on the display screen), which indicates the location of the local user (e.g., the distance from which the user is positioned from the (display screen of the) local device).

To map the locations of the (e.g., individual) virtual sound sources that are associated with canvas visual representations, the spatial parameter generator may be configured to determine one or more panning ranges of one or more speakers 12, within which virtual sound sources may be positioned. In one aspect, the panning ranges may be predefined. With the panning ranges, the spatial parameter generator generates one or more spatial parameters that may include one or more angles within the one or more panning ranges from the reference point to a location within the arrangement of virtual sound source locations that corresponds to a respective visual representation. As an example, referring to visual representation 44 of FIG. 8, these angles may include an azimuth angle (e.g., $-\theta_{L1}$) along a first axis (e.g., X-axis) between the location of the individual virtual sound source (e.g., $L_1$) and a second (reference or 0°) axis (e.g., the Z-axis), and may include an elevation angle (e.g., $+\beta_{L1}$) along a third axis (e.g., Y-axis) between $L_1$ and the second axis. More about determining the location of the virtual sound source is described herein.

In another aspect, the generator may determine one or more additional spatial parameters. For example, the generator may determine a distance (e.g., a distance in the Z-direction) at which the virtual sound source is to be perceived by the local user. In one aspect, the distance may be determined based on the size and/or location of the visual representation within the GUI. For instance, the generator may assign a first distance (e.g., from the reference point) to a first visual representation of a first size and assign a second distance to a second visual representation of a second size. In one aspect, the first distance may be shorter than the second distance when the first visual representation is larger than the second visual representation. For example, visual representation 44 of FIG. 3 may be assigned a shorter distance to a reference point, than a distance assigned to representation 45 and 46. In another aspect, distance may be based on the location of canvas visual representations, whereby higher positioned visual representations may have a shorter distance than visual representations that are positioned lower within the canvas region. In another aspect, distance may be defined based which region a representation is located. For instance, representations within the roster region 43 may have greater distance than (any of) the representations within the canvas.

In another aspect, the spatial parameters may include a reverberation level, with which the audio spatial renderer uses to apply reverberation to an input audio stream. In one aspect, the addition of reverberation onto streams may be based on where the virtual audio locations are modeled to being located in a virtual room around the device. Specifically, the spatial parameter generator may produce (or receive) a reverberation model of a room as a function of distance and/or position in the room, such that when applied to one or more input audio streams, gives the local user the audible impression that the communication session is occurring within a virtual room (e.g., the conversation between the remote participants and the local user occurring within a conference room). In some aspects, the generator may determine a reverberation level to be applied to one or more input audio streams based on one or more communication session parameters. For instance, a reverberation level may be based on the position and/or size of the visual representation, such as having a larger reverberation level for smaller sized visual representations to give the listener the impression that the virtual sound source associated with the visual representation is further away than a virtual sound source (which may be associated with a visual representation that is larger than the smaller sized one) with a lower applied reverberation level. In one aspect, the application of reverberation (by the renderer 23) may provide spatial depth to the virtual sound sources. More about the spatial parameters and how the parameters are generated is described in FIGS. 8-11B.

Once one or more spatial parameters for all (or most) of the virtual sound sources is determined, the generator determines whether spatial parameters of input audio streams are to be used to render individual sources. Specifically, the generator receives one or more control signals from the selector 27 that indicate which sets of communication parameters are associated with input audio streams that are to be individualized and which sets of parameters are associated with streams that are not to be individualized. The generator 25 passes along spatial parameters to the audio spatial renderer 23, which it is to use to spatial render respective input audio streams as individual virtual sound sources at the location indicated by the one or more spatial parameters.

For non-individualized streams, however, the generator may generate a different (or new set of) one or more spatial parameters for a mix of one or more input audio streams that indicates a particular location based on at least some of the spatial parameters of the streams in the mix. For example, the different spatial parameters may include determining a weighted combination of the spatial parameters of all (or some of the) input audio streams of the mix. As an example, the single virtual sound source 53 that is associated with the roster visual representations 47 and 48 is positioned in the middle of the visual representations within the roster region (or may be perceived to originate from a center of the roster region). This position may therefore be determined by averaging the spatial parameters of the two roster representations.

In another aspect, the location of a single virtual sound source that includes a mix of one or more input streams may be based on whether a remote participant within the mix is speaking. For example, the generator may analyze VAD parameters of the set of session parameters, and when the parameters indicate a participant is speaking (e.g., the voice activity being above a threshold), the generator may generate one or more spatial parameters for the mix, such that the virtual sound source of the mix is at a location of that participant's visual representation, similar to the placement of the individual virtual sound sources. To illustrate, referring to FIG. 3, the single virtual sound source may be positioned at a location based on which of the two remote participants 47 or 48 are speaking. In which case, the virtual sound source 53 may move (or toggle) from two positions (e.g., along the X-axis), depending on which of the two participants are talking.

In another aspect, the generator may use a weighted combination of the position of visual representations, if the weighting of a particular stream's visual representation is a function of the energy level of the stream's audio, the virtual sound may be determined by the position data of the more dominant (e.g., with the highest voice activity, etc.) audio sources in the mix. For example, when the visual representations of the roster region are in a row, as illustrated in FIG. 3, the sound location may be closer to the representation of a remote participant that has the most (or highest) voice activity with respect to the other remote participants. Thus, the audio position can move even if the visual representations themselves do not move, adapting to voice activity within the row (or column) of visual representations. Furthermore, as visual representations move between the canvas region and roster region, a determination of which streams are individual rendered and which are mixed may adapt based on one or more of the same criteria mentioned herein. Thus, the generation of spatial parameters may be dynamic throughout the communication session for both the individual virtual sound sources and the single sound source of the mix. As with the individualized virtual sound sources, the generator passes along the spatial parameters of the single virtual sound source to the renderer 23.

In one aspect, the differences in the arrangements may be based on the panning ranges of the speakers. More about panning ranges is described herein.

The matrix/router 26 is configured to receive the N input audio streams (e.g., as N input audio channels) from the manager 21 and receive one or more control signals from the stream selector 27 that indicates which streams are individualized and non-individualized, and is configured to route the audio streams via (e.g., the predefined) output audio streams to the audio spatial renderer 23. Specifically, the matrix/router 26 is configured to route M individual audio streams, each of which was selected by the stream selector as needing to be individually spatial rendered, via its own output audio stream. In other words, the router assigns an output audio stream (or channel) to the each of the N audio streams that are going to be spatial rendered separately. In addition, the matrix/router mixes non-individualized audio streams (e.g., by performing matrix mixing operations) into a mix of audio streams (e.g., as a single audio output stream).

The audio spatial renderer 23 is configured to receive a number of input audio streams. As illustrated, this may correspond to the M individual audio streams and one or more single audio streams corresponding to a mix of one or more audio streams. In one aspect, there may be more than one input audio stream corresponding to a mix, as described herein. For each input audio stream, the renderer also receives spatial parameters which directs how the input stream is to be rendered. The renderer receives input streams and spatial parameters for each stream, and is configured to spatial render the streams according to the spatial parameters to produce a (e.g., three-dimensional (3D) sound field that includes an) arrangement of virtual sound sources using one or more speakers 12. Specifically, for each input stream, the audio spatial renderer 23 creates a spatial rendering of that stream internally. These spatial renderings are then combined, e.g., by summing, to create an output audio stream (e.g., that may include two or more driver signals for driving the speakers). In one aspect, the audio spatial render may render each of the audio streams using any spatial rendering method, such as Vector-Based Amplitude Panning (VBAP) to output the individual virtual sound sources that each include a separate individual audio stream, and a single sound source that includes the mix of audio streams at locations indicated by respective spatial parameters by two or more speakers. In another aspect, the renderer may apply other spatial operations, such as upmixing one or more individual audio streams using the spatial parameters to produce multi-channel for driving two or more speakers. For instance, the renderer may produce multichannel audio in a surround sound multi-channel format (e.g., 5.1, 7.1, etc.), where each channel is used to drive a particular speaker 12.

In one aspect, the renderer may apply other spatial operations to produce a binaural two-channel output signal (e.g., which may be used to drive headphones, as described herein). In one aspect, the renderer to spatial render the input audio streams, the renderer may apply one or more spatial filters, such as head-related transfer functions (HRTFs). For example, using the spatial parameters (which may include azimuth angle, elevation angle, distance, reverberation level, etc., as described herein), the renderer may determine one or more HRTFs, and may apply the HRTFs upon the received input audio streams to produce binaural audio signals that provide spatial audio. In one aspect, the spatial filters may be generic or predetermined spatial filters (e.g., determined in a controlled setting, such as a laboratory), which may be applied by the renderer for a predetermined position based on the distance indicated by the spatial parameters (e.g., which is generally optimized for one or more listeners and/or the sweet spot in front of the audio device). In another aspect, the spatial filters may be user-specific according to one or more measurements of a listener's head (e.g., which may be determined based on user input or may be determined automatically by the local device). For instance, the system may determine the HRTFs, or equivalently, a head-related impulse response (HRIR) that is based on the listener's anthropometrics. For instance, the renderer may receive sensor data (e.g., image data produced by the camera 15), and use the data to determine the listener's anthropometrics.

In another aspect, the renderer may perform a cross-talk cancellation (XTC) algorithm. For example, the renderer may perform the algorithm by mixing and/or delaying (e.g., by applying one or more XTC filters upon) the audio streams to produce one or more XTC signals (or driver signals). In one aspect, the renderer may produce one or more first XTC audio signals that contains (at least a portion of) audio content of the audio streams that is to be primarily heard at one ear (e.g., a left ear) of the listener who is within a sweet spot (e.g., which may be in front of and facing the local device), and produce one or more second XTC audio signals that contains audio content of the audio streams that is to be primarily heard at another ear of the user (e.g., right ear), when used to drive one or more of the speakers.

In some aspects, the renderer 23 may perform one or more additional audio signal processing operations. For example, the renderer may apply reverberation upon one or more of the input audio streams (or the rendering of the streams) based on the received reverberation level received with the spatial parameters. In another aspect, the renderer may perform one or more equalization operations (e.g., to spectrally shape) upon one or more streams, such as by applying one or more filters, such as a low-pass filter, a band-pass filter, a high-pass filter, etc. In another aspect, the renderer may apply one or more scalar gain values to one or more streams. In some aspects, the application of equalization and scalar gain values may be based on the distance value of the spatial parameters, such that the application of the operations provide spaciousness (or depth) to the respective virtual sound sources.

As a result of spatial rendering of each individual input audio stream and the one or more mixes of input audio streams, the renderer produces a single set of (e.g., one or more) driver signals that are used to drive one or more speakers 12, which may be a part of the local device or may be separate from the local device, in order to produce the 3D sound field that includes each of the individual virtual sound sources and one or more single virtual sound sources, as described herein.

In some aspects, the controller 10 may perform one or more additional audio signal processing operations. For example, the controller may be configured to perform an active noise cancellation (ANC) function to cause the one or more speakers to produce anti-noise in order to reduce ambient noise from the environment that is leaking into the user's ears (e.g., when the speakers are a part of headphones being worn by the local user). The ANC function may be implemented as one of a feedforward ANC, a feedback ANC, or a combination thereof. As a result, the controller may receive a reference microphone signal from a microphone that captures external ambient sound, such as microphone 14. In another aspect, the controller may perform any ANC method to produce the anti-noise. In another aspect, the controller may perform a transparency function in which sound played back by the device is a reproduction of the ambient sound that is captured by the device's external microphone in a "transparent" manner, e.g., as if headphones were not being worn by the user. The controller processes at least one microphone signal captured by at least one microphone and filters the signal through a transparency filter, which may reduce acoustic occlusion due the audio output device being on, in, or over the user's ear, while also preserving the spatial filtering effect of the wear's anatomical features (e.g., head, pinna, shoulder, etc.). The filter also helps preserve the timbre and spatial cues associated with the actual ambient sound. In one aspect, the filter of the transparency function may be user specific according to specific measurements of the user's head. For instance, the controller may determine the transparency filter according to a HRTF or, equivalently, a HRIR that is based on the user's anthropometrics.

In another aspect, the controller 10 may perform decorrelation upon one or more audio streams in order to provide a more (or less) diffuse 3D sound field. In some aspects, decorrelation may be activated based on whether the local device is outputting the 3D sound field vis a headset or via one or more (extra-aural) speakers, which may be integrated within the local device. In another aspect, the controller may perform echo cancellation operations. Specifically, the controller may determine a linear filter based on a transmission path between one or more microphones 14 and one or more speakers 12, and apply the filter to the audio streams to generate an estimate of echo, which is subtracted from the microphone signal(s) captured by the one or more microphones. In some aspects, the controller may use any method of echo cancellation.

As described thus far, the audio spatial controller 20 is configured to spatial render one or more input audio streams that are associated with canvas visual representations as individual virtual sound sources. In another aspect, however, the controller may spatial render a mix of one or more input audio streams of canvas remote participants as one virtual sound source. In one aspect, it may have only one such grouped mix, or it may use multiple mixes. As described herein, the spatial audio controller may have a predefined number of output audio channels for individualized spatial rendering. In some instances, however, the controller may determine that more virtual sound sources are required than the local device can output. For instance, additional remote participants may join the communication session, and the controller may determine that one or more of their respective input audio streams are to be individually rendered, as described herein. As another example, the controller may determine that existing remote participants who previously were not individually rendered may now require their out individual virtual sound source. For instance, during the communication session, the controller may determine that a roster remote participant is to move from the roster into the canvas region based on the criteria mentioned herein. Thus, if output audio channels are required, but there are not enough available channels (e.g., the total number of output audio channels has been reached by the existing spatial rendering of existing virtual sound sources, etc.), the audio spatial controller may begin to spatial render a mix of canvas input audio streams to a single virtual sound source. In one aspect, this determination may be based on the position of visual representations within the canvas region. For example, the controller may perform vector quantization operations with respect to visual representation locations within the GUI to group (as a mix) one or more input audio streams of adjacent visual representations. In another aspect, the controller may group streams based on distance between visual representations within the canvas region (e.g., being within a threshold distance). In yet another aspect, the controller may assign predefined regions within the (e.g., canvas region of the) GUI, whereby streams associated with visual representations within a region are mixed. More about regions is described herein.

Once groupings of one or more input audio streams are determined, the (e.g., spatial parameter generator 25 of the) controller may determine one or more spatial parameters for the mix (e.g., in a similar manner as the determination of spatial parameters for roster representations, such as determining a weighted combination of spatial parameters of streams in the mix, etc.), and transmit the spatial to the matrix/router 26 to mix the input audio streams and to transmit the mix as one of the output audio channels. In one aspect, the mixing of audio streams may be dynamic as the visual representations within the GUI change.

In another aspect, the output audio channels may be predefined, as to whether the channel supports an individual input audio stream or a mix of input audio streams. In which case, the controller may be configured to accommodate a number of individual virtual sound sources and a number of mixed sound sources. In one aspect, the determination of which input audio streams to mix and how many may be based on these numbers.

In one aspect, the audio spatial controller 20 may dynamically render input audio streams, such that the controller adjusts the rendering based on changes to the (e.g., local device of the) audio system 1. As described herein, the spatial parameters may be generated based on the panning ranges of the speakers of the local device. In one aspect, panning ranges may change based on certain criteria. For instance, panning ranges may be based on the physical arrangement of speakers that are integrated within the local device. Thus, as the local device changes its position and/or orientation, the panning ranges may also change. As a result, the audio spatial controller may be configured to adjust spatial rendering based on any changes to the local device, such as a change in orientation and/or a change to the aspect ratio of the GUI with respect to the display screen. More about adjusting spatial rendering based on changes to the local device and/or the aspect ratio of the GUI is described in FIGS. 12-15.

FIGS. 5, 6, 9, 13, and 15 are flowcharts of processes 30, 90, 80, 140, and 170, respectively, for performing one or more audio signal processing operations for spatial rendering input audio streams of a communication session. In one aspect, the processes may be performed by one or more devices of the audio system 1, as illustrated in FIG. 1. For instance, at least some of the operations of these processes may be performed by (e.g., controller 10 of) the local device 2. In another aspect, at least some of the operations may be performed by another device, such as a remote server that is communicatively coupled with the local device.

Figure 5:
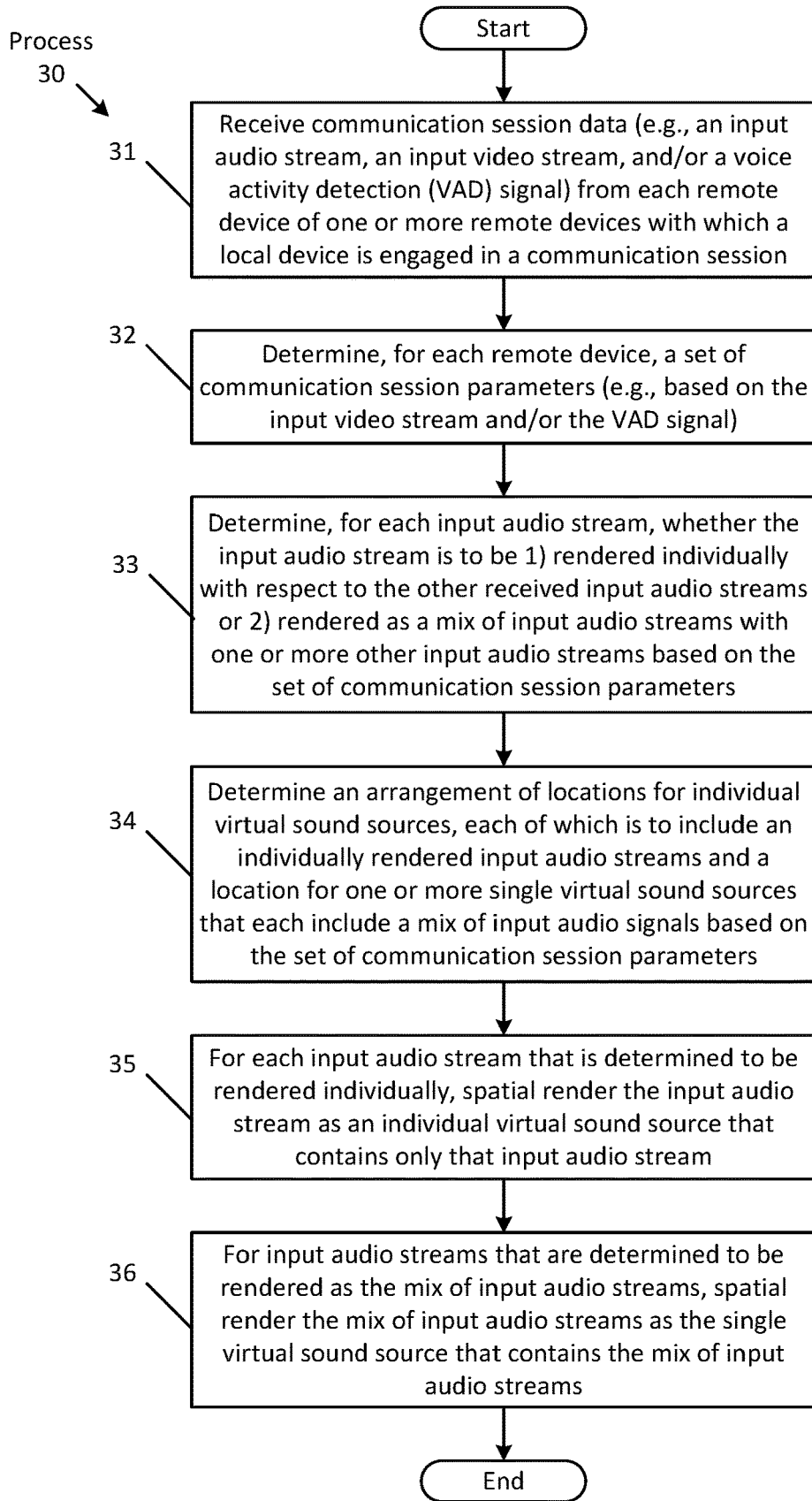
FIG. 5 is a flowchart of one aspect of a process for determining whether input audio streams are to be rendered individually as individual virtual sound sources or are to be mixed and rendered as a single virtual sound source, and for determining an arrangement of the virtual sound sources locations.

Regarding FIG. 5, this figure is a flowchart of one aspect of a process 30 for determining whether input audio streams are to be rendered individually as individual virtual sound sources or are to be mixed and rendered as a single virtual sound source, and for determining an arrangement of the virtual sound sources locations. In one aspect, the operations described within the process are performed by one or more operations blocks of the controller 10, as described in FIG. 4. In one aspect, prior to the beginning of the process, the local device 2 has engaged in a communication session with one or more remote devices 3, as described herein. The process begins by the controller 10 receiving communication session data (e.g., an input audio stream, an input video stream, and/or a VAD signal) from each remote device of one or more remote devices with which the local device is engaged in a communication session (at block 31). The controller 10 determines, for each remote device, a set of communication session parameters (e.g., based on the input video stream and/or the VAD signal) (at block 32). For instance, the video renderer may determine one or more VAD parameters, a size of a visual representation of each input video stream within the GUI, a location of the visual representation, a reverberation level, etc., as the parameters. The controller 10 determines, for each input audio stream, whether the input audio stream is to be 1) rendered individually with respect to the other received input audio streams or 2) rendered as a mix of input audio streams with one or more other input audio streams based on the set of communication session parameters (at block 33). The controller 10 determines an arrangement of locations for 1) individual virtual sound sources, each of which is to include an individually rendered input audio stream and 2) a location of one or more single virtual sound source that each include a mix of input audio signals based on the set of communication session parameters (at block 34). Specifically, in determining the arrangement, the controller determines spatial parameters for each input audio stream (e.g., based on the location of a visual representation of a respective input video stream within the communication session GUI displayed on the display screen 13). In addition, the (e.g., matrix/router 26 of the) controller may perform the matrix mixing operations to mix the one or more input audio streams to produce the mix of input audio streams, based on the arrangement of visual representations. The controller 10 spatial renders each input audio stream that is determined to be rendered individually as an individual virtual sound source that contains only that input audio stream (at block 35). The controller 10 also spatial renders each mix of input audio streams as a single virtual sound source that contains a mix (at block 36).

Figure 6:
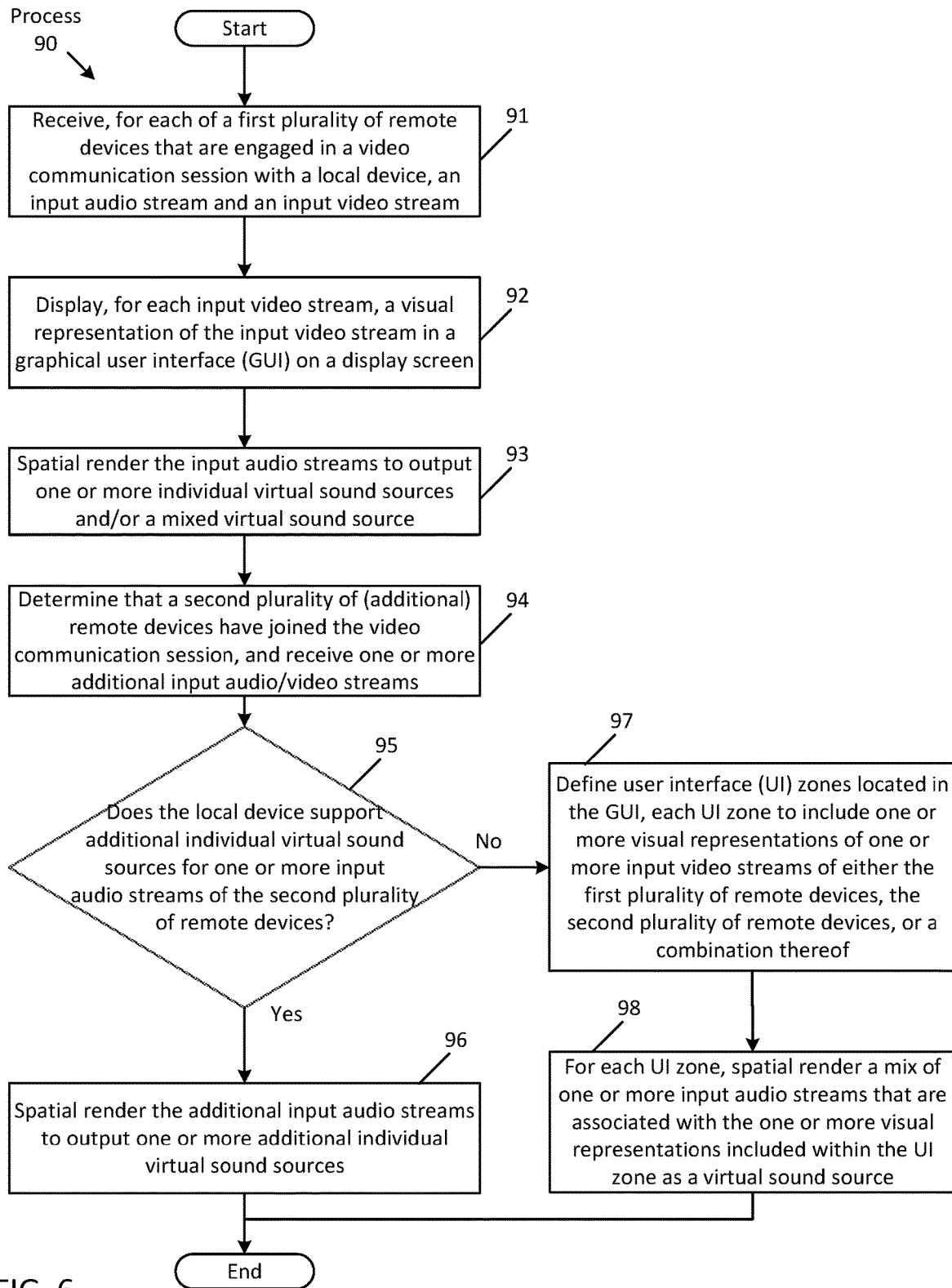
FIG. 6 is a flowchart of one aspect of a process for defining UI zones and spatial rendering input audio streams associated with the UI zones.

As described thus far, the controller 10 manages assignment of output audio channels to individual input audio streams based on one or more criteria (e.g., whether a remote participant is actively speaking). This is to ensure that the number of assigned output audio channels (some of which including individualized input audio streams and/or a mix of one or more input audio channels) does not exceed a predefined number in order to optimize computational resources. In some instances, however, the controller may determine that the number of input audio streams that are determined to be individually rendered as individual virtual sound sources exceed the predefined number of audio output channels. This may be due, for example, to a significant number of remote participants that are actively speaking (e.g., having a VAD parameter value that is above the threshold). As a result, rather than exceed the predefined number of output audio streams, the controller may assign one or more input audio streams as a mix to a single virtual sound source, as described herein. In addition, the controller may adjust the arrangement of virtual sound source locations. As described herein, the controller may group up one or more input audio streams of the canvas region and render the group to a virtual sound source. In another aspect, the controller may adjust the arrangement of virtual sound source locations and visual representations in a grid-like fashion in order to accommodate more remote participants. FIG. 6 describes the process of determining whether to adjust the arrangements based on the addition of remote participants within the communication session, which may result in exceeding the predefined number of output audio channels if their respective input audio streams were individually spatial rendered as individual virtual sound sources.

Specifically, FIG. 6 is a flowchart of one aspect of a process 90 for defining user interface (UI) zones (e.g., in a grid) that each include one or more visual representations, and spatial rendering input audio streams associated with the representations that are within the UI zones. The process 90 begins by the controller receiving an input audio stream and an input video stream for each of a first group of remote devices that are engaged in a video communication session with the local device (at block 91). The controller displays, for each input video stream, a visual representation of the input video stream in a GUI on the display screen 13 (at block 92). Specifically, the video renderer 22 receives the input video streams (and VAD parameters), and determines the arrangement of the visual representations. Once determined, the renderer displays the video streams on the display. The controller spatial renders the input audio streams to output one or more individual virtual sound sources and/or a single virtual sound source that includes a mix of input audio streams (at block 93). Thus, at this point, the local user 40 can perceive the audio of the remote participants at virtual sound source locations within the physical environment, as illustrated in FIG. 3. For example, the controller may spatial render at least one input audio stream to output a (e.g., individual) virtual sound source that includes the input audio stream by one or more speakers 12. In one aspect, a number of individual virtual sound sources may be below the predefined The controller 10 determines that a second group of (one or more additional) remote devices have joined the video communication session (at block 94). In one aspect, this determination may be based on a request received by the session manager 21 for one or more additional remote devices to engaged in the pre-existing communication session. In response, the session manager may accept the request and establish a communication channel with the remote devices to begin receiving session data. In another aspect, the determination may be based upon the session manager receiving session data from newly added remote devices to the communication session. For instance, the session may be an "open" session, in which remote participants can freely join the session (e.g., without requiring authorization from the local device and/or other remote devices that are already engaged in the session). In response to determining that the second group has joined the call, the controller receives input audio and video streams from each of the remote devices.

The controller 10 determines whether the local device supports additional individual virtual sound sources for one or more input audio streams of the second group of remote devices (at decision block 95). Specifically, as described herein, the (e.g., controller 10 of the) local device may be configured to spatial render a predefined number of input audios stream as individual virtual sound sources. In the existing configuration (e.g., being engaged in a video communication session with the first group of remote devices), the controller 10 is already rendering a number of individual input audio streams, which may be below the predefined number. Thus, the individual audio stream selector 27 may receive additional sets of communication session parameters, and determine whether additional input audio streams are to be rendered as individual virtual sound sources. In particular, the selector determines whether a number of input audio streams of the first and second groups of remote devices that are determined to be individually spatial rendered is greater than the predefined number.

If so, the controller determines that the local device does not support the aggregation of individualized streams that may be required for the communication session. In response, the controller 10 defines several (or one or more) UI zones located in the GUI, each UI zone including one or more visual representations of one or more input video streams of either the first group of remote devices, the second group of remote devices, or a combination thereof that are to be displayed in the UI zone (at block 97). For example, the (e.g., video renderer 22 of the) controller 10 may display all of the visual representations associated with the first and second group of remote devices in a grid (e.g., in one or more rows and one or more columns). In one aspect, the visual representations may be evenly spaced between edges of the display screen and each other, and/or may be of a same size. The controller 10 establishes a virtual grid of UI zones on the GUI, where each UI zone encompasses one or more visual representations. For instance, when establishing the grid, the controller may assign one or more adjacent visual representations within the GUI to each UI zone. In another aspect, the controller may define the UI zones based on the number of visual representations and/or input audio streams received from the two groups of remote devices. For example, if the predefined number of individual virtual sound sources (or output channels) is four and there are eight input audio streams, the controller may evenly assign (or distribute) two input audio streams to each UI zone, such that a number of defined UI zones does not exceed the predefined number.

Once the UI zones are defined, the controller spatial renders, for each UI zone, a mix of one or more input audio streams that are associated with the one or more visual representations that are included within the UI zone as a virtual sound source by the speakers 12 (at block 98). Specifically, the controller may spatial render the mix such that each zone is associated with its own virtual sound source. For example, each zone's virtual sound source may be located at a location within the UI zone displayed on the display screen. In particular, the virtual sound source may be positioned at a center of the UI zone, such that audio from input audio streams of the zone are perceived by the local user to originate from the zone. In one aspect, the controller may dynamically position a virtual sound source based on voice activity of one or more remote participants associated with the zone. For instance, the controller may place the virtual sound source on a visual representation associated with one input audio stream of the mix of input audio streams of the zone that has a signal energy level that is above a threshold (e.g., is associated with a voice activity that is greater than a threshold, indicating that the remote participant is speaking).

If, however, the local device does support additional input audio streams to be individually rendered, the controller spatial renders the additional input audio streams to output one or more additional individual virtual sound sources (at block 96). Specifically, the controller may add visual representations to the (e.g., canvas region of the) GUI of the communication session, and output the additional streams as individual sources. In don't so, the controller may rearrange the arrangement of virtual sound source locations. In addition to adding individual virtual sound sources, the controller may also add one or more input audio streams to the mix of input audio streams that are rendered as the single virtual sound source of the roster region of the GUI.

In one aspect, the controller 10 may redefine UI zones based on whether remote devices are added or removed from the communication session. For instance, in response to a third group of remote devices having joined the session, the controller may redefine the UI zones by at least one of 1) adding visual representations of input audio streams from the third group into already defined UI zones, 2) creating one or more new UI zones (e.g., which may include at least one input video stream of the third group), or 3) a combination thereof. Thus, the controller may dynamically redefine the UI zones as needed. In another aspect, the controller may define the UI zones based on user input of the local device (e.g., the user selecting a menu option, which when selected instructs the controller to define the UI zones, as described herein). In some aspects, the controller 10 may switch between defining UI zones for spatial rendering input audio streams and providing the GUI with the canvas region and the roster region (e.g., based on whether the predefined number of output audio channels have been exceeded).

Figure 7:
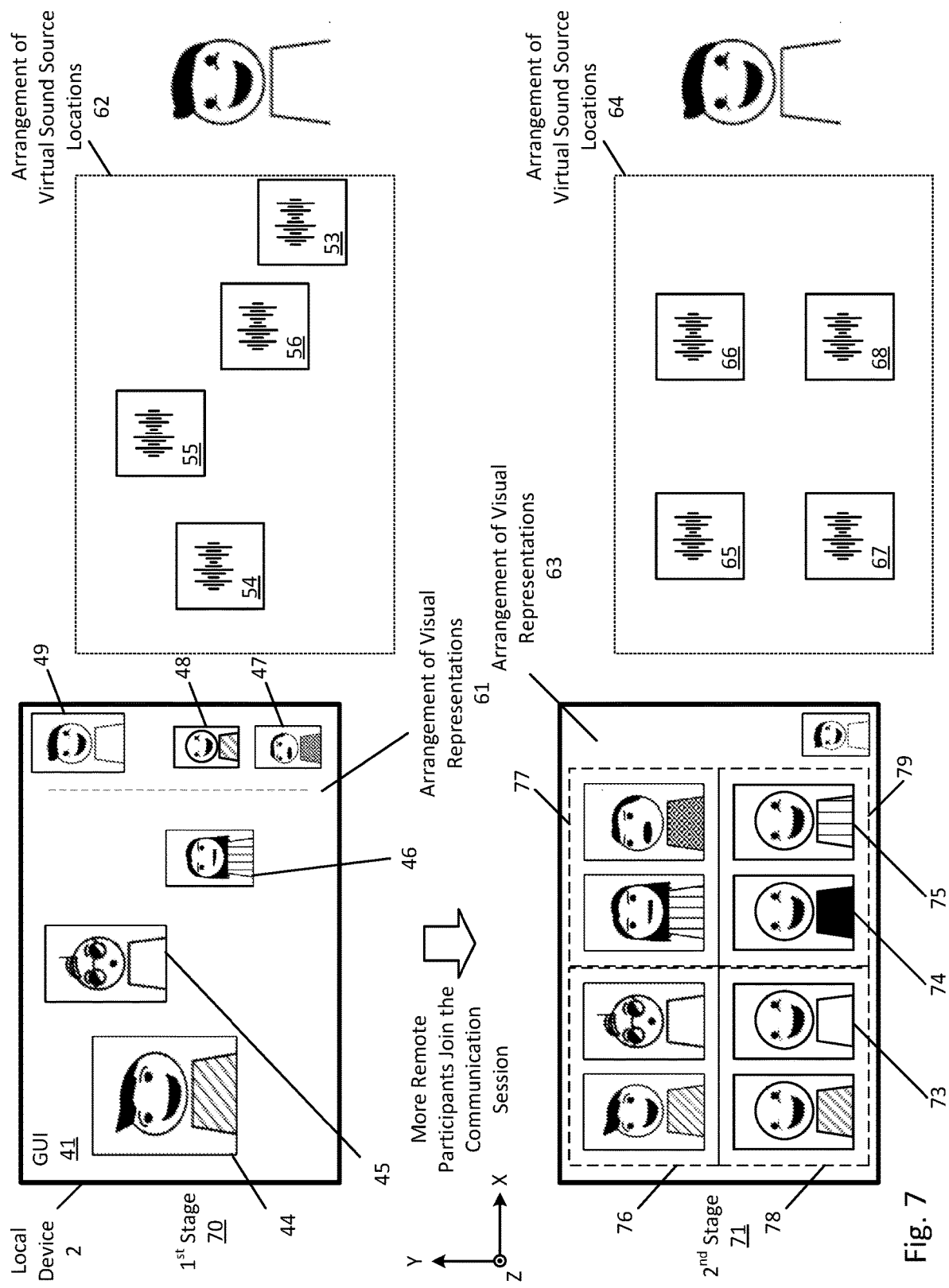
FIG. 7 illustrates several stages in which a local device defines user interface (UI) zones for one or more visual representations of input video streams of one or more remote devices and spatial renders one or more input audio streams associated with the defined UI zones according to one aspect.

FIG. 7 illustrates several stages 70 and 71 in which the local device 2 defines UI zones for one or more visual representations of input video streams, and spatial renders one or more input audio streams associated with the defined UI zones according to one aspect. Specifically, the first stage 70 illustrates the communication session GUI 41 and locations of virtual sound sources 62 of the session while the local user is participating within the session. In particular, this figure shows the visual representations 44-48 of the remote participants and the visual representation of the local user 49 in an arrangement 61 in the GUI 41 that is displayed on the display screen 13 of the local device. Specifically, this arrangement is different than arrangement 51 of FIG. 3, due to the orientation of the local device. For instance, the local device illustrated in FIG. 3 is in a portrait orientation, whereas the device illustrated in this figure is in a landscape orientation (e.g., rotated 90° about a center axis of the local device). In this arrangement 61, representations within the canvas region 42 are spread wider within the GUI than their locations in arrangement 51 of FIG. 3 (e.g., spread wider along the X-axis). In addition, the roster region 43 is shown on the side (right side) of the GUI, where the visual representations are stacked in a column, rather than a row. In addition, the arrangement of virtual sound source locations 62 is similarly arranged as the arrangement of visual representations 61. For example, sound source 55 that corresponds to visual representation 45 is vertically higher and in between sound sources 54 and 56, which correspond to visual representations 44 and 46, respectively, which are vertically lower and on either side of representation 45. As described herein, the arrangement of virtual sound sources 62 may be proportionally larger than the arrangement of visual representations (e.g., spread wider and higher with respect to the representations). In another aspect, however, the sound sources may be located on (or near) their respective representations, whereby sound sources 54-56 are centered on their respective visual representations 44-46, and the virtual sound source of the roster 53 is positioned in the center of both roster representations 47 and 48.

In one aspect, the position of the roster region 43 in this arrangement may be similarly positioned as in the arrangement 51 of FIG. 3. For instance, rather than the roster visual representations being in a stacked column, they may be positioned in a row, e.g., at the bottom of the GUI 41. In another aspect, the visual representations within the roster region may be optional, such that remote participants may not be placed into the roster region if not needed. For example, when there are sufficient output audio channels and/or each of the remote participants meet the criteria to be within the canvas region, the controller 10 may position all remote participants within the canvas region. In which case, the GUI may not include the roster region.

The second stage 71 illustrates the result of more remote participants joining the communication session, and in response, the controller 10 of the local device defining UI zones, each of which having one or more visual representations. Specifically, as shown three new remote participants 73-75 have joined the communication session. In one aspect, the controller may have determined that one or more of the new participants was to be spatial rendered as an individual virtual sound source. In addition, however, the controller may have determined that if individually rendered, the local device may exceed the optimal (predefined) number of individually renderings. As a result, the controller has defined four (simulated) regions 76-79 as a grid, each region in the grid being a UI zone. The arrangement of visual representations 63, which include the three newly added remote participants, has also been arranged in a grid, where two visual representations have been assigned to each zone. In addition, the size of the existing visual representations has been adjusted such that all of the representations are of the same size.

Along with the rearrangement of the visual representations, the controller is outputting four different virtual sound sources 65-68, which are in a new arrangement 64. Specifically, the virtual sound sources 65-68 have been arranged in a grid similar to the grid of simulated regions 76-79. In one aspect, the arrangement of virtual sound source locations 64 may be proportional to the arrangement of UI zones 76-79. In another aspect, the virtual sound source location may be on (or adjacent) to their respective UI zone. In which case, each virtual sound source may be positioned in a center of its respective zone. In one aspect, the arrangement of virtual sound source locations 64 may be static during the communication session, such that remote participants that share a virtual sound source (e.g., remote participants 74 and 75 sharing sound source 68) have the same spatial cues as they speak. In another aspect, a UI zone's virtual sound source location may dynamically change its location based on which remote participant within the zone is talking. For example, virtual sound source 68 may move horizontally depending on whether remote participant 74 or 75 is speaking.

In one aspect, the controller may arrange the visual representations and/or the virtual sound sources differently. For instance, the controller may define different sized regions within the GUI, each region being associated with one or more virtual sound sources that include one or more input audio streams.

As described thus far, the controller determines spatial parameters based on the location of the visual representation within the GUI. In one aspect, the controller may spatial render input audio streams that are not associated with displayed (or visible) visual representations within the GUI. Specifically, the video renderer may not display one or more visual representations associated with rendered input audio streams. For example, the video renderer may determine that the GUI does not have enough empty space to support displaying one or more additional visual representations (e.g., without overcrowding the display). As another example, the communication session may have more roster remote participants than can be displayed within the roster region. For instance, referring to FIG. 3, the roster region includes two visual representations 47 and 48. If, however, several additional remote participants were added, the visual representations (at that size) would not fit along the width of the GUI. In yet another example, the video renderer may not receive an input audio stream from one or more remote devices. In which case, the spatial parameter generator 25 may determine a location of a virtual sound source that does not include an associated visual representation to be positioned off (or to the side of) the GUI (and/or to the side of other virtual sound sources). Thus, referring to FIG. 3, when an "invisible" virtual sound source is rendered in the arrangement 50, the source may be positioned to the right of the GUI 41.

Figure 8:
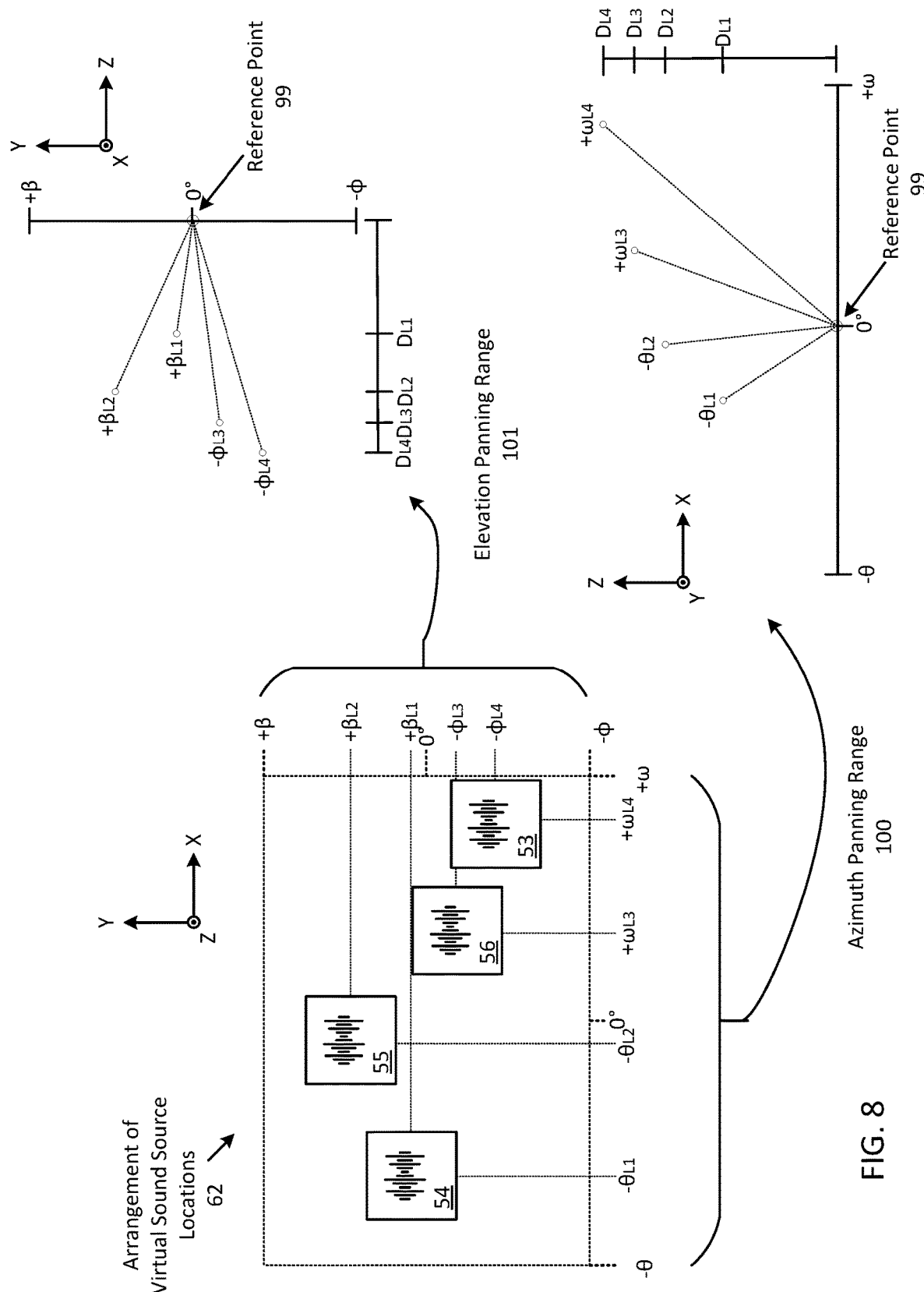
FIG. 8 illustrates panning angles used to render input audio streams at their respective virtual sound source locations according to one aspect.

As described herein, the (e.g., audio spatial controller 20 of the) controller 10 is configured to determine spatial parameters that indicates locations of virtual sound sources for one or more input audio streams based on the visual representations displayed in the GUI 41. This spatial parameters may include panning angles, such as azimuth panning angles and elevation panning angles with respect to at least one reference point in space (e.g., a location of the local user or the user's head), a distance between the virtual sound source and the reference point, and reverberation levels. FIG. 8 illustrates panning angles that are used to render input audio streams at their respective virtual sound source locations in a 3D sound field. Specifically, this figure shows the arrangement of virtual sound source locations 62 that correspond to the arrangement of visual representations 61, as illustrated in FIG. 7, along with azimuth and elevation panning angles for each source and a distance between the sources and a reference point. As shown, the arrangement 62 is bounded by panning ranges of the one or more speakers that are used to output the virtual sources. In particular, these bounds include an azimuth panning range, $-\varphi-+\omega$, that spans the width of the arrangement along the X-axis, and the elevation panning range, $-\varphi-+\beta$, spans the height of the arrangement along the Y-axis. In one aspect, the speakers may produce a virtual sound source anywhere within the bounded ranges. In some aspects, the bounds of the arrangement correspond to positions of the speakers. For example, these bounds may correspond to the dimensions of the local device, in which case the local device may be configured to produce virtual sound sources in front of (e.g, the display screen) of the device. In particular, the azimuth panning range may span a width of the (e.g., display screen of the) local device and the elevation panning range may span a height of the (e.g., display screen of the) local device. As a result, the locations of the virtual sound sources 54-56 may located on (or in front of) their corresponding visual representations, 44-46, respectively, as describe herein. In another aspect, the controller may define these panning ranges (from wider possible panning ranges), in order to position the virtual sound sources within a particular region (e.g., in front of, besides, and/or behind) the display screen of the local device.

In addition, this figure illustrates the panning angles with respect to a reference point 99 in space (e.g., within the physical environment). For instance, the azimuth panning range 100 includes azimuth angles of the four virtual sound sources 53-54 (or $L_1$-$L_4$, respectively) relative (or at) the reference point 99, along the horizontal X-axis. Specifically, the reference point is the vertex of each angle and each azimuth panning angle extends away from a 0° reference axis, the Z-axis, (e.g., or towards either $-\varphi$ or $+\omega$), along the horizontal X-axis. Similarly, the elevation panning range 101 shows each of the elevation angles for the four virtual sound sources relative to the reference point along the vertical Y-axis. Again, the reference point is the vertex of each angle, and each elevation angle extends away from the 0° reference axis (e.g., or towards either −φ or +β), along the vertical Y-axis. In addition, distance (along the Z-axis) between the reference point and each of the virtual sound sources is shown as $D_{L1}$-$D_{L4}$ for the four sources $L_1$-$L_4$, respectively. Thus, when spatial rendered the virtual sound sources that correspond to the spatial parameters will be perceived by the local user to originate at the azimuth, elevation, and distance from the local user in order to provide a more three-dimensional (3D) spatial experience.

Figure 9:
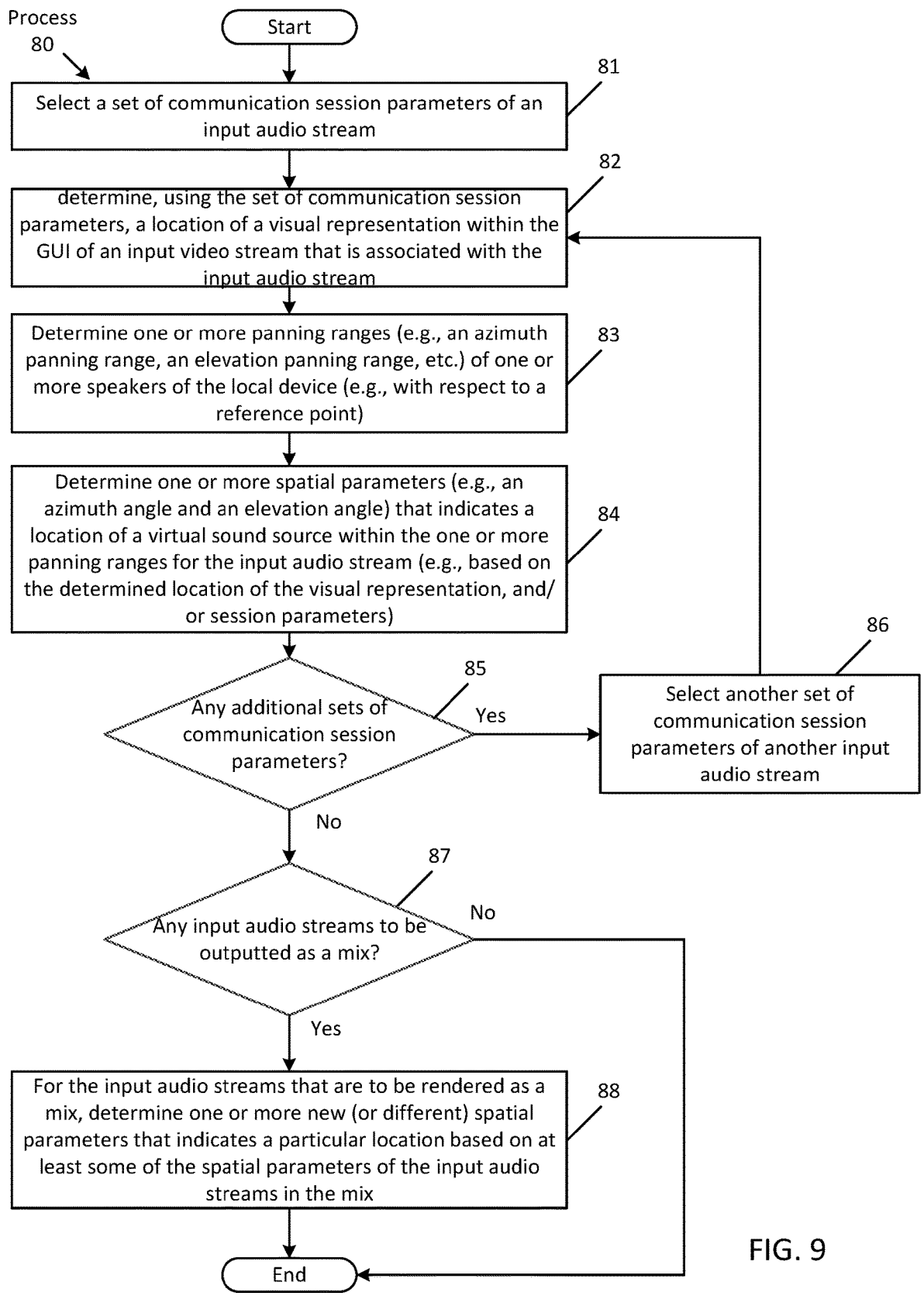
FIG. 9 is a flowchart of one aspect of a process for determining spatial parameters that indicates a location at which an input audio stream is to be spatial rendered as a virtual sound source based on a location of a respective visual representation according to one aspect.

FIG. 9 is a flowchart of one aspect of a process 80 for determining one or more spatial parameters that indicate a (3D) location at which an input audio stream is to be spatial rendered as a virtual sound source based on a location of a respective visual representation according to one aspect. In one aspect, the spatial parameter generator 25 of the controller 20 may perform at least some of these operations to determine spatial parameters for each input audio stream of a communication session. This process will be described with reference to FIGS. 10-11B, each of which illustrate different examples as to how to map locations of virtual sound sources to corresponding visual representations.

The process 80 begins by the generator 25 selecting a set of communication session parameters of an input audio stream (at block 81). For instance, the generator may receive all N sets from the session manager in a data structure, and may select the first set. As described herein, the session parameters may include information regarding the visual representations, such as their size, location, a prominence value, and associated VAD parameters. The generator determines, using the set of communication session parameters, a location of a visual representation of an input audio stream that is associated with the input audio stream (at block 82). For instance, the session parameters may include location information (e.g., X, Y-coordinates) of the visual representation, with respect to the GUI and/or with respect to the display screen on which the GUI is displayed. The generator determines one or more panning ranges (e.g., an azimuth panning range, an elevation panning range, etc.) of one or more speakers (at block 83). Specifically, these angle ranges may correspond to the maximum (or minimum) range at which a virtual sound source may be (e.g., optimally) positions within space, such as azimuth panning ranges −φ−+ω and elevation panning ranges −φ−+β, shown in FIG. 8. In one aspect, the panning ranges may be based on the physical position and/or orientation of the speakers (and/or device in which the speakers are housed). For example, (e.g., when the speakers are integrated within the local device) the panning ranges may be based on the orientation of the device. For example, when the local device is in a portrait orientation (e.g., as illustrated in FIG. 3), the speakers of the device may have a narrow azimuth panning range that spans along the width of the device, whereas when the local device is in a landscape orientation (e.g., as illustrated in FIG. 7), the speakers of the device may have a wider azimuth panning range that spans along the width of the device (e.g., relative to a reference point in space). Thus, the generator may determine the orientation of the (e.g., local device that house the) speakers, and from the orientation determine the azimuth panning range (e.g., that spans along a horizontal, X-axis, and determine an elevation panning range (e.g., that spans along a vertical, Y-axis). For instance, upon determining the orientation (e.g., based on IMU data from the IMU 16), the generator may perform a table lookup into a data structure that stores predefined panning ranges associated with one or more orientations of the device. More about determining panning ranges based on the orientation of the device is described in FIGS. 12 and 13. The generator determines spatial parameters (e.g., an azimuth angle and an elevation angle) that indicates a location of a virtual sound source (e.g., with respect to a reference point in space) within the one or more panning ranges for the input audio stream based on the determined location of the visual representation within the GUI (at block 84).

For example, the generator may perform one or more methods to determine the spatial parameters for each virtual sound source. may determine spatial parameters based on the physical location of the local user with respect to the orientation (or position) of the local device. For instance, the generator may use sensor data (e.g., image data captured by camera 15) to determine the position and/or orientation of the local user (e.g., the local user's head) with respect to the display screen. The generator may determine at least one of an azimuth angle and elevation angle from the local user to each visual representation displayed on the GUI of the local device.

In another aspect, the generator may determine spatial parameters by linearly mapping angles based on the locations of visual representations relative to the size of the GUI within the display screen. For example, referring to FIG. 10, the generator may determine the spatial parameters by using one or more functions to map locations of visual representations to angles at which the input audio streams are to be rendered according to one aspect. Specifically, the generator may map locations of virtual sound sources based on locations of visual representations displayed in the GUI with respect to dimensions of the GUI. This figure shows the GUI 41 of the communication session (displayed on the display screen of the local device) that includes two visual representations, 44 and 45, each with a remote participant with which the local user is engaged in the session. The GUI has a width, X, along the X-axis and has a height, Y, along the Y-axis. In one aspect, the dimensions of the GUI may be based on the size of the GUI that is displayed on the display screen (or with respect to the display screen). In one aspect, when the GUI covers the entire display screen, the dimensions of the GUI would equal that of the display screen. Displayed on each visual representation is a simulated center point of the representations, which represents the location (e.g., X, Y-coordinates) of the representation within the GUI. For instance, the location of representation 44, $L_1$, is ($X_{L1}$, $Y_{L1}$) and the location of representation 45, $L_2$, is ($X_{L2}$, $Y_{L2}$). In another aspect, other locations may be defined. For instance, the simulated point may be positioned over a particular portion of a visual representation, such as a portion that is displays a mouth of the remote participant (which may be identified using an object recognition algorithm).

In one aspect, the functions that are used to map the locations of the (e.g., panning angles of the) virtual sound sources to the visual representations are linear functions of panning angles with respect to the dimensions of the GUI. For example, the azimuth function 111 is a linear function of the azimuth panning range −θ−+ω with respect to a fractional relationship between X-positions and the total width, X, of the GUI. Thus, the azimuth panning range starts from the left side of the GUI (e.g., where X=0), and ends at the right side of the GUI. The elevation function 113 is a linear function of the elevation panning range −φ−+β with respect to a fractional relationship between Y-positions and the total height, Y, of the GUI. Thus, the elevation panning range starts from the bottom of the GUI (e.g., where Y=0), and ends at a top side of the GUI. These relationships between panning ranges and dimensions of the GUI, allow the generator to map locations relative to the GUI, regardless of the size of the GUI and/or regardless of the size of the panning range.

To determine the panning angles of the visual representations, the generator may apply fractional relationships of the positions of the visual representations as input into one or both of the linear functions. For example, to determine an azimuth angle for a virtual sound source, the generator may use an x-coordinate of a location of a visual representation within the GUI as input to a function of azimuth panning range. Specifically, as shown, fractional positional relationships of the visual representations ($X_{L1}/X$ and $X_{L2}/X$) are mapped to azimuth panning angles that intersect the linear function at $X_{L1}/X$ and $X_{L2}/X$, as shown in 111. The resulting mapping of these fractional relationships to azimuth angles are illustrated by the azimuth panning range 112, which shows the azimuth angle for $L_1$, $-\theta_{L1}$ and for $L_2$, $+\omega_{L2}$ at the reference point 99. Similarly, to determine an elevation panning angle for a virtual sound source, the generator may use a y-coordinate of a location of the visual representation as input into a (e.g., separate) function of elevation panning range. In particular, fractional positional relationships of the visual representations ($Y_{L1}/Y$ and $Y_{L2}/Y$) are mapped to elevation panning angles that intersect the linear function 113 at $Y_{L1}/Y$ and $Y_{L2}/Y$. The resulting mapping of these fractional relationships to elevation angles are illustrated by the elevation panning range 114, which shows a side-view of the elevation angles for $L_1$, $-\phi_{L1}$, and for $L_2$, $+\beta_{L2}$ at the reference point.

Figure 11A:
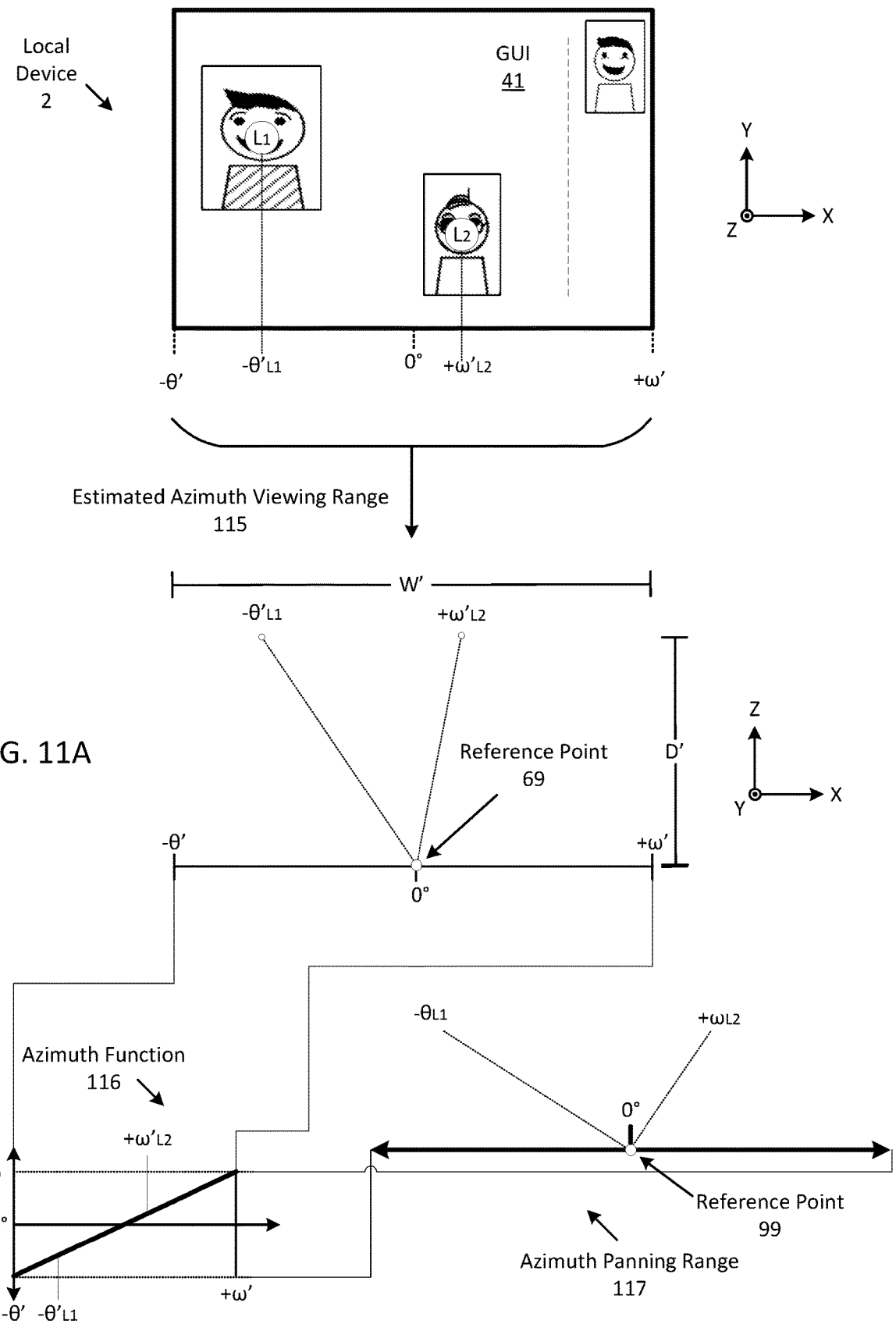
FIGS. 11A and 11B show an example of determining spatial parameters by using one or more functions to map locations of estimated or real viewing angles of visual representations (e.g., using an assumed screen size and viewing position) to audio panning angles at which input audio streams are to be rendered according to one aspect.
Figure 11B:
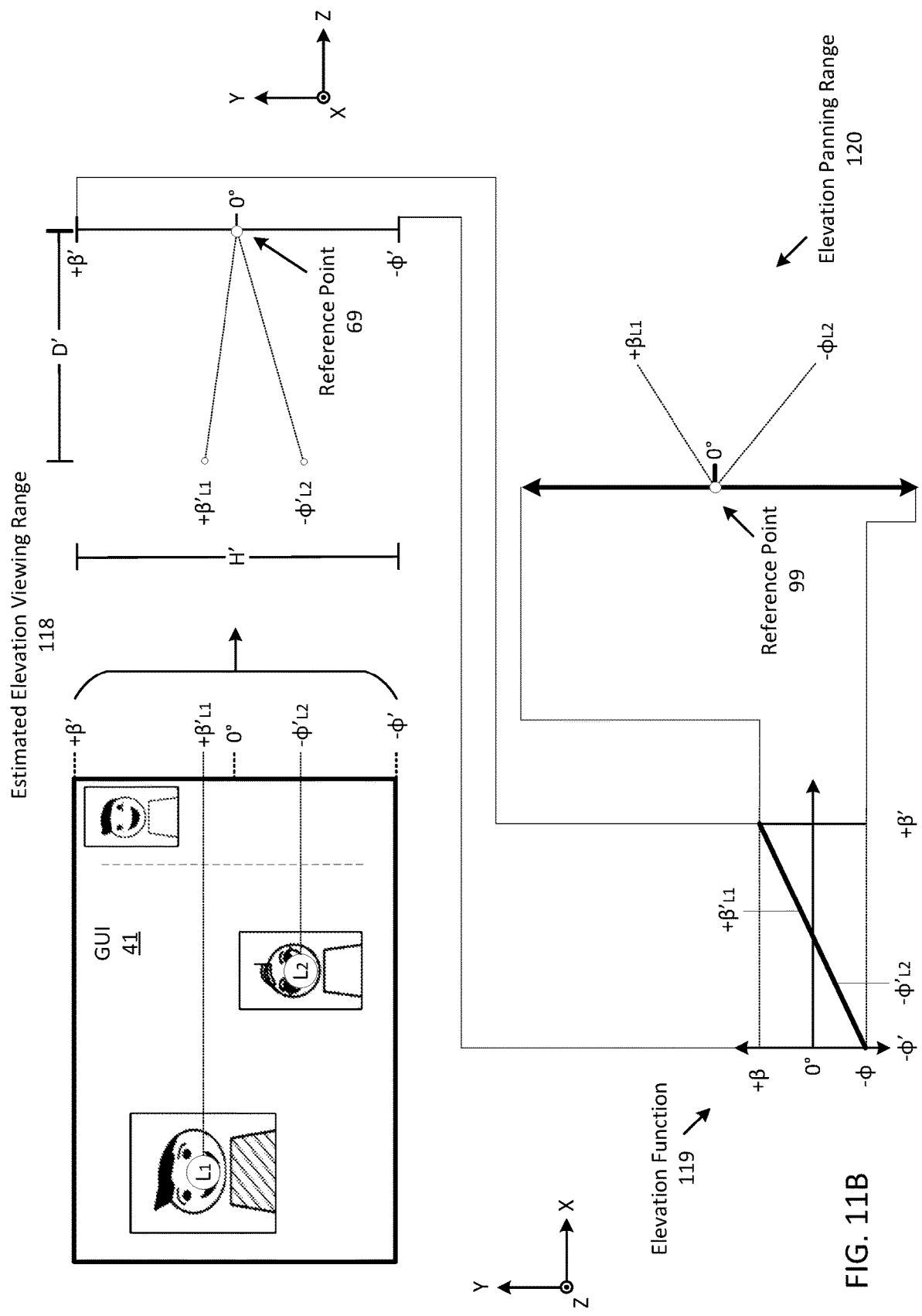

In another aspect, the spatial parameters may be determined based on viewing angles of a (predefined) position of the local user (e.g., where the user or a reference point in space is a vertex from which the angles are determined). FIGS. 11A and 11B show an example of determining spatial parameters by using one or more functions to map locations of viewing angles of visual representations to panning angles at which input audio streams are to be rendered according to one aspect. Specifically, the generator may map locations of visual representations as viewing angles at a reference point to one or more panning angles of one or more panning ranges. Referring to FIG. 11A, this figure shows the GUI 41 that includes the two visual representations 44 and 45, as shown in FIG. 9. Here, however, rather than determining the fractional relationship between the locations of the visual representation and the total width/height of the GUI, the generator determines estimated viewing angles of the GUI from a reference point 69 (e.g., at a predefined location in space). For instance, the GUI has an estimated azimuth viewing range 115 between $-\theta'$–$+\omega'$, that spans the width, W', of the GUI and along the X-axis. The estimated azimuth viewing range is shown as a top-down view in which the reference point 69 is in front of the GUI (or display screen) at a distance, D', from the GUI (or display screen), where the GUI has a width of W'. In one aspect, the estimated azimuth viewing range is a predetermined viewing range of the local user, as the user is looking at the display screen while it is displaying the GUI. In some aspects, W', D', and/or the location of the reference point may be predefined, for instance, D' may be the optimal viewing location for the local user. In another aspect, these dimensions may be determined by the generator. For instance, the generator may obtain sensor data from one or more sensor (e.g., image data from the camera 15, proximity sensor data, etc.), and from the sensor data determine the distance at which the local user is positioned. With respect to the width, the generator may determine the width of the GUI that is currently being displayed on the display screen. Knowing the D', W', and the location of the reference point, the generator determines the azimuth viewing angle for $L_1$ as $-\theta_{L1}'$ and the azimuth viewing angle for $L_2$ as $+\omega'_{L2}$, where these angles are from their respective visual representations on the GUI to the reference point.

To determine the (actual) azimuth panning angles, the generator may apply the viewing angles as input for one or more linear functions. For example, this figure shows an azimuth function 116 that is a linear function of the azimuth panning range $-\theta$–$+\omega$ with respect to the estimated azimuth viewing range $-\theta'$–$+\omega'$. The generator maps the viewing angles $-\theta_{L1}'$ and $+\omega_{L2}'$ to the actual azimuth angles that intersect the linear function. The mapping of these is illustrated by the azimuth panning range 117, which shows $-\theta_{L1}$ and $+\omega_{L2}$ at the reference point 99. In one aspect, the reference point 99 may be the same as reference point 69 (e.g., both at the same location in space with respect to the local device).

Referring to FIG. 11B, this figure relates to determining the elevation panning angles based on estimated elevation viewing angles from reference point 69. Specifically, the controller may perform similar operations as described in FIG. 11A to determine the elevation panning angles. For example, as shown, the an estimated elevation viewing range 118 between $-\phi'$–$+\beta'$, spans the height, H', of the GUI and along the Y-axis. Specifically, this viewing range is a side-view of the GUI (or display screen) and the reference point 69 that is at the (predefined) distance, D'. In one aspect, H' may be a predefined height for the GUI, or may be the current height of the GUI with respect to the display screen. From the reference point, the generator determines the elevation viewing angle for L1 as $+\beta'L1$ and the elevation viewing angle for L2 as $-\phi'L2$. To determine the actual elevation angles, the generator applies the elevation viewing angles as input for the elevation function 119 of the elevation panning range $-\phi$–$+\beta$ with respect to the elevation viewing range $-\phi'$–$+\beta'$. The generator maps the viewing angles $+\beta'L1$ and $-\phi'L2$ to the actual elevation angles that intersect the function 119. The mapping of these is illustrated by the elevation panning range 120. In one aspect, the generator may perform either method described in FIGS. 10-11B to map the locations of the visual representations to locations of the virtual sound sources.

In addition, the generator may determine other spatial parameters, such as distances between virtual sound sources and the reference point based on the communication session parameters. As described herein, the distance between a virtual sound source and the local user may be based on the size and/or location of the visual representations. For example, similar to a physical conversation in which closer people are louder than people that are further away, the generator may assign a shorter distance to visual representations that are larger than a distance for a visual representation that is smaller. In one aspect, distance may be based on the position of the visual representations within the GUI. For instance, visual representations that are higher within the canvas region (e.g., along the Y-axis) may be given a shorter distance than visual representations that are further down the Y-axis. In some aspects, visual representations that are within the roster may be assigned the furthest distance with respect to all of the canvas visual representations. In another aspect, distance may also be based on VAD parameters. For instance, remote participants that are associated with VAD parameters that indicate a high signal energy level (e.g., above a threshold) may be assigned a closer distance than remote participants with lower VAD parameters. In some aspects, the generator may define reverb values for each of the input audio streams based on the same criteria as mentioned above. For instance, with remote participants within the roster region may be assigned a high reverb value to sound more diffuse to the local user.

As described herein, the controller may apply use one or more linear functions to determine panning angles. In some aspects, one or more of the functions may be more general non-linear or piece-wise linear functions of panning angles (e.g., with respect to fractional relationships and/or viewing panning angles, as described herein).

Returning to FIG. 9, the controller determines whether there are any additional sets of communication session parameters of which one or more spatial parameters have not yet been determined (at decision block 85). If so, the controller selects another set of communication session parameters of another input audio stream that has not been analyzed for determining one or more spatial parameters. Otherwise, the controller determines whether any input audio streams are to be outputted as a mix (at decision block 87). For example, the controller may determine whether any of the input audio streams are associated with remote participants that are in the roster region. In some aspect, this determination may be based on whether the selector 27 has assigned one or more input audio streams to a single output audio stream (e.g., which may be the case when there are no more individual output audio streams for canvas remote participants to have individual virtual sound sources. In another aspect, this determination may be based on the output audio stream to which the input audio streams have been assigned, as described herein. If so, the controller determines, for the input audio streams that are to be rendered as a mix, new (or different) spatial parameters that indicates a particular location based on at least some of the spatial parameters of the input audio streams of the mix (at block 87). As described herein, the controller is to spatial render the mix to output the single virtual sound source that includes the mix. Thus, the controller determines one set of spatial parameters for the single virtual sound, which may be based on at least some of the determined spatial parameters. For instance, the new spatial parameters may be a weighted combination of at least some of the spatial parameters. In which case, the single virtual sound source may be positioned in center of simulated virtual sound sources that would otherwise be produced if each of the input audio streams were to be spatial rendered as individual virtual audio streams that were mapped at locations based on respective visual representations within the roster region. In another aspect, rather than being new spatial parameters, the determined spatial parameters may be based on one set of determined data. In another aspect, the spatial parameters may not be based on the determined data, rather the spatial parameters may be associated with a particular location in space. For instance, the spatial parameters may indicate an azimuth angle and elevation angle that are both at 0°, such that the spatial audio of the roster is right in front of the local user.

In some aspects, the controller may determine the spatial parameters for the mix of input audio streams differently. For instance, rather than determining the spatial parameters from the individually determined spatial parameters, the controller may combine communication session parameters (e.g., locations/sizes of visual representations, distances, VAD parameters, prominence value, etc.) for at least some of the input audio streams of the mix. For instance, the controller may determine an average of at least some of the parameters. Once the combined (or joint) communication session parameters are determined, the controller may determine the spatial parameters, as described herein.

Once the controller determines the spatial parameters, the input audio streams are spatialized according to the data in order to output one or more virtual sound sources, each of which including one or more input audio streams, as described herein.

In one aspect, the locations of virtual sound sources may change based on one or more criteria. For example, as described herein, to spatial render an input audio stream spatial parameters is determined that indicates the location of the resulting virtual sound source. The determined spatial parameters may be dependent upon the panning range of the local device, as described herein. As a result, when changes to the panning ranges occur, the local device may adjust virtual sound sources that are currently being output to accommodate the change. For example, panning ranges may change as a result of the local device changing orientation. As another example, panning ranges may be based on an aspect ratio of the GUI of the communication session that is displayed on the local device's display screen. The following figures describe adjusting the virtual sound sources based on changes to panning ranges of the local device.

Figure 12:
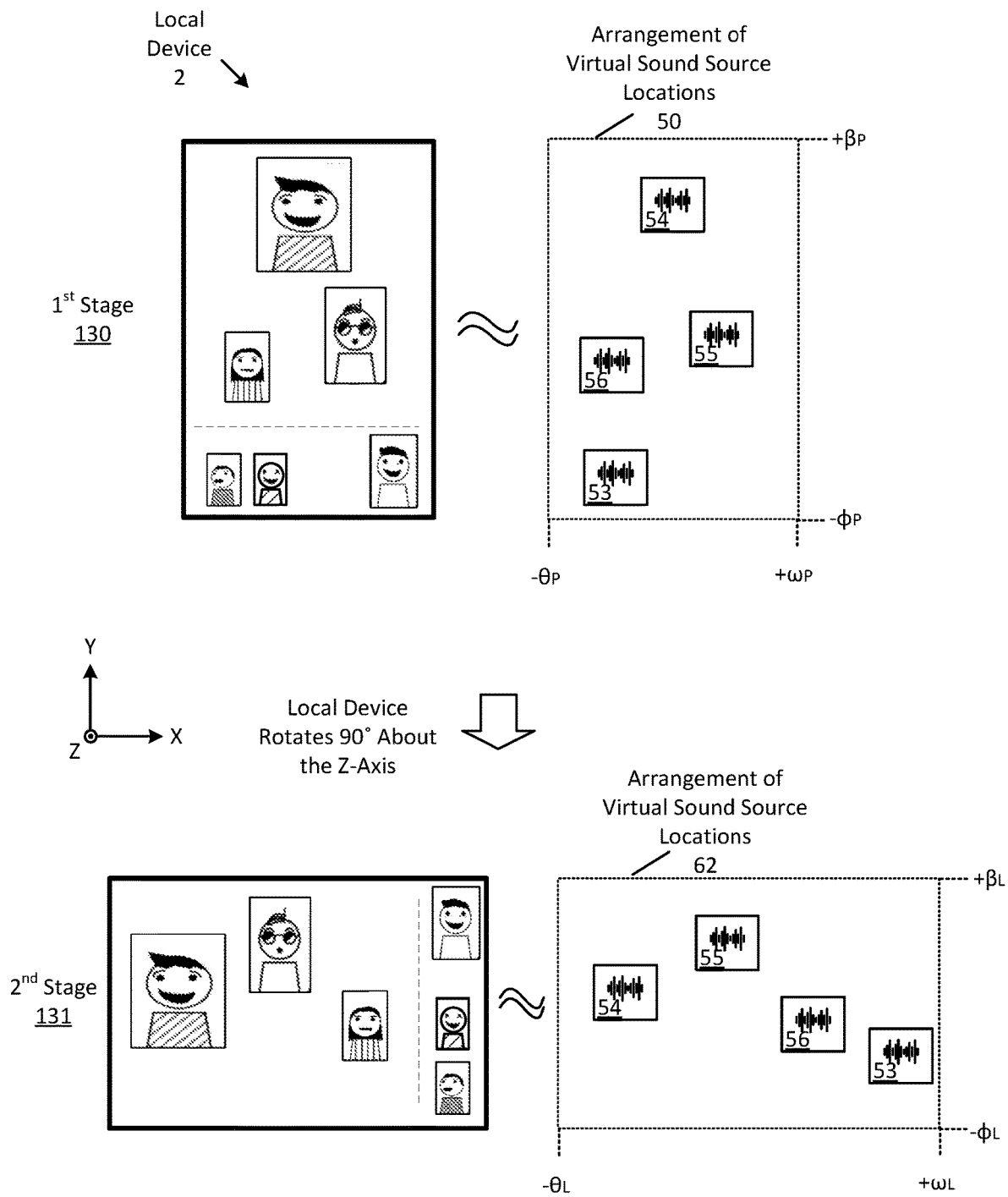
FIG. 12 shows several stages in which panning ranges of one or more speakers are adjusted based on the local device rotating from a portrait orientation to a landscape orientation.

FIG. 12 shows several stages 130 and 131 in which panning ranges of one or more speakers are adjusted based on the local device rotating from a portrait orientation to a landscape orientation. For example, each stage shows the GUI 41 of the local device 2 while engaged in a communication session, and a corresponding arrangement of virtual sound source locations, where each arrangement shows several panning angle ranges. Specifically, each stage shows the azimuth panning range $-\theta$–$+\omega$, along the X-axis and the elevation panning range $-\phi$–$+\beta$ along the Y-axis. As described herein, one or more of the ranges may change based on the orientation of the device.

The first stage 130 shows the local device that is orientated in a portrait orientation, where the height along the Y-axis is greater than the width along the X-axis. Also shown is the arrangement of virtual sound source locations 50 that shows the four virtual sound sources 53-56. Specifically, as described herein, for each of the sources 54-56 the local device is outputting an input audio stream as a virtual source at a location within the arrangement of locations 50 with respect to a reference point that is off of the local device (e.g., a point at which the local user is located, or a predefined point, as described herein. In addition, the local device is outputting a mix of input audio streams as the single virtual sound source 53. In addition to showing the locations of virtual sound sources, the arrangement 50 also shows the panning ranges for the local device while it is in this portrait orientation. Specifically, the azimuth panning range is $-\theta_P$–$+\omega_P$, and the elevation panning range $-\phi_P$–$\beta_P$.

The second stage 131 shows the result of the local device rotating 90° about the Z-axis. Specifically, the local device has rotated into a landscape orientation, where the width along the X-axis is greater than the height along the Y-axis. In addition, the panning ranges of the local device have also changed. As shown, the azimuth panning range is $-\theta_L$–$+\omega_L$, is wider (e.g., having a greater range) than $-\theta_P$–$+\omega_P$, and the elevation range is $-\phi_L$–$+\beta_L$, which is narrower (e.g., having a reduced range) than $-\phi_P$–$+\beta_P$. In one aspect, the changes in panning ranges may be based on the components or design of the local device. For instance, the panning ranges may be defined based on the number and/or position of speakers of the local device. When the device rotates into a new orientation, the panning ranges may rotate as well. In another aspect, the panning ranges may be defined by the controller and may be adjusted by the controller in response to determining that the orientation of the local device has changed. For instance, upon determining that the device is now in a landscape orientation, the controller may determine panning ranges for this orientation (e.g., by perform a table lookup into a data structure that associates one or more panning ranges with orientations), and then use the determined panning ranges for spatial rendering, as described herein.

In addition, in response to the orientation of the local device changing to the new landscape orientation, one or more locations of virtual sound sources are adjusted along one or more axis with respect to a reference point. Specifically, due to the rotation of the local device the virtual sound locations are in the arrangement 62. As described herein, the positions of the virtual sound sources have been adjusted such that they are spread wider along the X-axis and are narrower along the Y-axis, as compared to the virtual sound sources while they were in the arrangement 50 when the local device was in the portrait orientation. As a result, the local user may perceive virtual sound sources differently based on the orientation of the local device.

Figure 13:
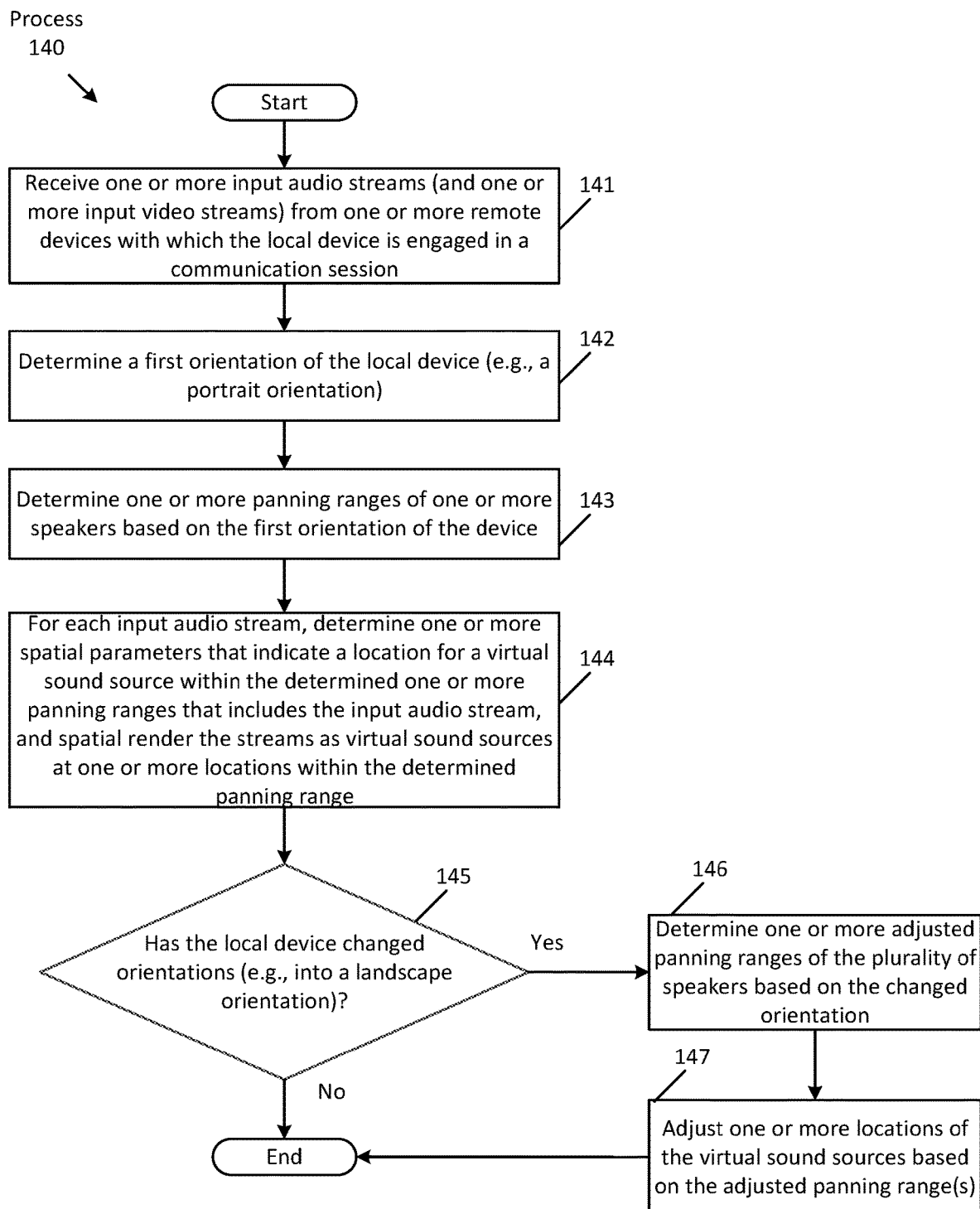
FIG. 13 is a flowchart of one aspect of a process for adjusting locations of one or more virtual sound sources based on changes to one or more panning ranges of one or more speakers based on a change to an orientation of the local device.

FIG. 13 is a flowchart of one aspect of a process 140 for adjusting locations of one or more virtual sound sources based on changes to one or more panning ranges of one or more speakers based on a change to an orientation of the local device. In one aspect, this process will be described in reference to FIG. 12. The process 140 begins by the controller 10 of the local device 2 receiving one or more input audios streams (and one or more input video streams) from one or more remote devices with which the local device is engaged in a (video) communication session (at block 141). The controller determines a first orientation of the local device (at block 142). For example, the controller 10 may determine the orientation of the device based on sensor data, such as IMU data from the IMU 16. In one aspect, the IMU data may indicate that the local device is in a portrait orientation, as illustrated in the first stage 130 in FIG. 12. The controller determines one or more panning ranges of the one or more speakers (which are communicatively coupled to or a part) of the local device (at block 143). As described herein, the controller may perform a table lookup into a data structure that associates orientations and/or positions of the speakers and/or local device with one or more panning ranges. In response, the controller may determine the azimuth (e.g., horizontal) panning range while the device is in the portrait orientation as $-\theta_P$-+$\omega_P$, and the elevation (e.g., vertical) panning range as $-\phi_P$-+$\beta_P$. The controller determines, for each input audio stream, one or more spatial parameters that indicate a location for a virtual sound source within the determined one or more panning ranges that includes the input audio stream, and spatial renders the streams as virtual sound sources at one or more locations within the determined panning ranges (at block 144). For example, the controller may perform at least some of the operations described in process 80 of FIG. 9 to spatial render input audio streams as one or more individual virtual sound sources and/or spatial render a mix of one or more streams as a single virtual sound source.

The controller determines whether the local device has changed orientations (e.g., at decision block 145). Specifically, the controller may determine whether the orientation has changed (e.g., from the portrait orientation to a landscape orientation) based on IMU data, as described herein. If so, the controller determines one or more adjusted panning ranges of the one or more speakers based on the changed orientation (at block 146). For example, referring back to FIG. 12, the adjusted panning ranges correspond to the local device being in the landscape orientation. The controller then adjusts one or more locations of the virtual sound sources based on the adjusted panning ranges (at block 147). For example, the controller may adjust a virtual sound source's azimuth angle and/or elevation angle with respect to a reference point. For instance, as illustrated in FIG. 12, in response to the local device rotating into landscape, the virtual sound source 54's azimuth angle widens closer to the lower boundary, $-\theta_L$, from its azimuth position while the local device was in portrait. In one aspect, to adjust locations the controller may perform the operations of process 80 to adjust the locations. For instance, in response to performing the operations based on the local device rotating into a landscape orientation, the virtual sound source locations 62 in FIG. 12 span wider along the azimuth panning range and are narrower along the elevation panning range. In another aspect, the controller may adjust the locations without needing to determine new spatial parameters, as described in process 80. For instance, the controller may adjust the virtual sound source locations by rotating the locations based on the rotation of the device. For example, the controller may rotate the virtual sound source locations by 90°, in response to determining that the local device has rotated from portrait to landscape.

In another aspect, the controller may adjust locations based on differences of panning angles between two or more orientations. For instance, the controller may adjust locations proportionally to differences between the panning angle of the first orientation and the panning angle of the second orientation. For instance, referring to FIG. 12, the azimuth panning angle from portrait to landscape may increase by 50%, whereas elevation may decrease by 50%. Thus, to adjust the locations, azimuth and elevation angles may proportionally change with respect to the difference between their respective panning ranges of the two orientations.

In one aspect, the locations of the virtual sound sources may remain in their same locations (e.g., on the display screen) with respect to GUI, when the local device rotates. For example, referring to FIG. 12, although the positions of the virtual sound sources has changed with respect to the panning ranges, due to the ranges increasing/decreasing, the positions of the virtual sound sources may remain the same with respect to the rotated local device, such that the virtual sound sources are rotated along with the local device. Thus, as the device rotates, the local user may perceive the virtual sound source to maintain its location with respect to the display screen, such that both the visual representation and its associated virtual sound source move together.

In another aspect, the virtual sound sources may move back to their original locations once the local device rotates in the opposite direction. For instance, if the local user rotates the local device −90°, the virtual sound sources may return to their original locations, as shown in the first stage 130 of FIG. 12.

Figure 14A:
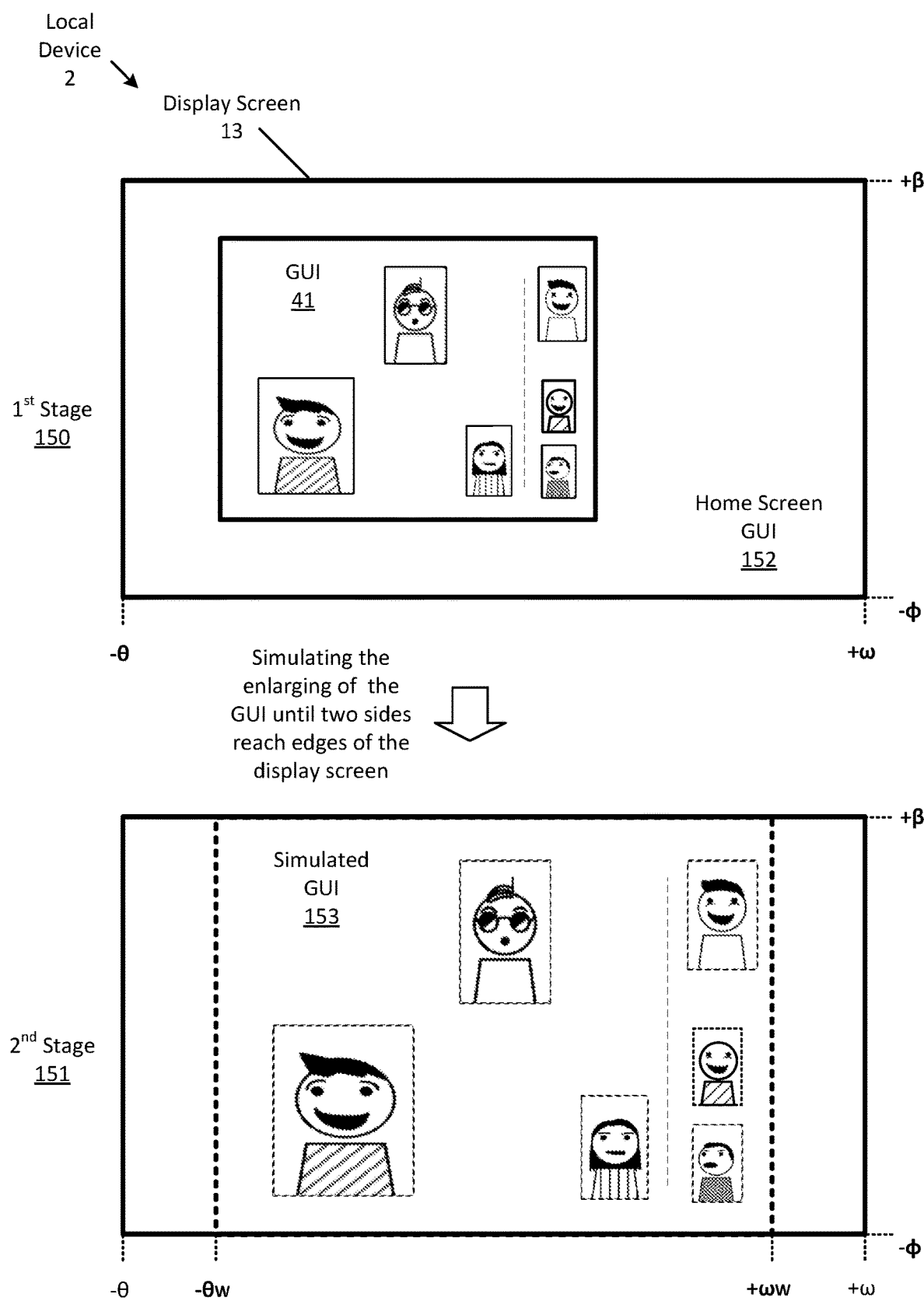
FIGS. 14A and 14B show several stages in which panning ranges are adjusted based on an aspect ratio of the GUI of the communication session according to some aspects.
Figure 14B:
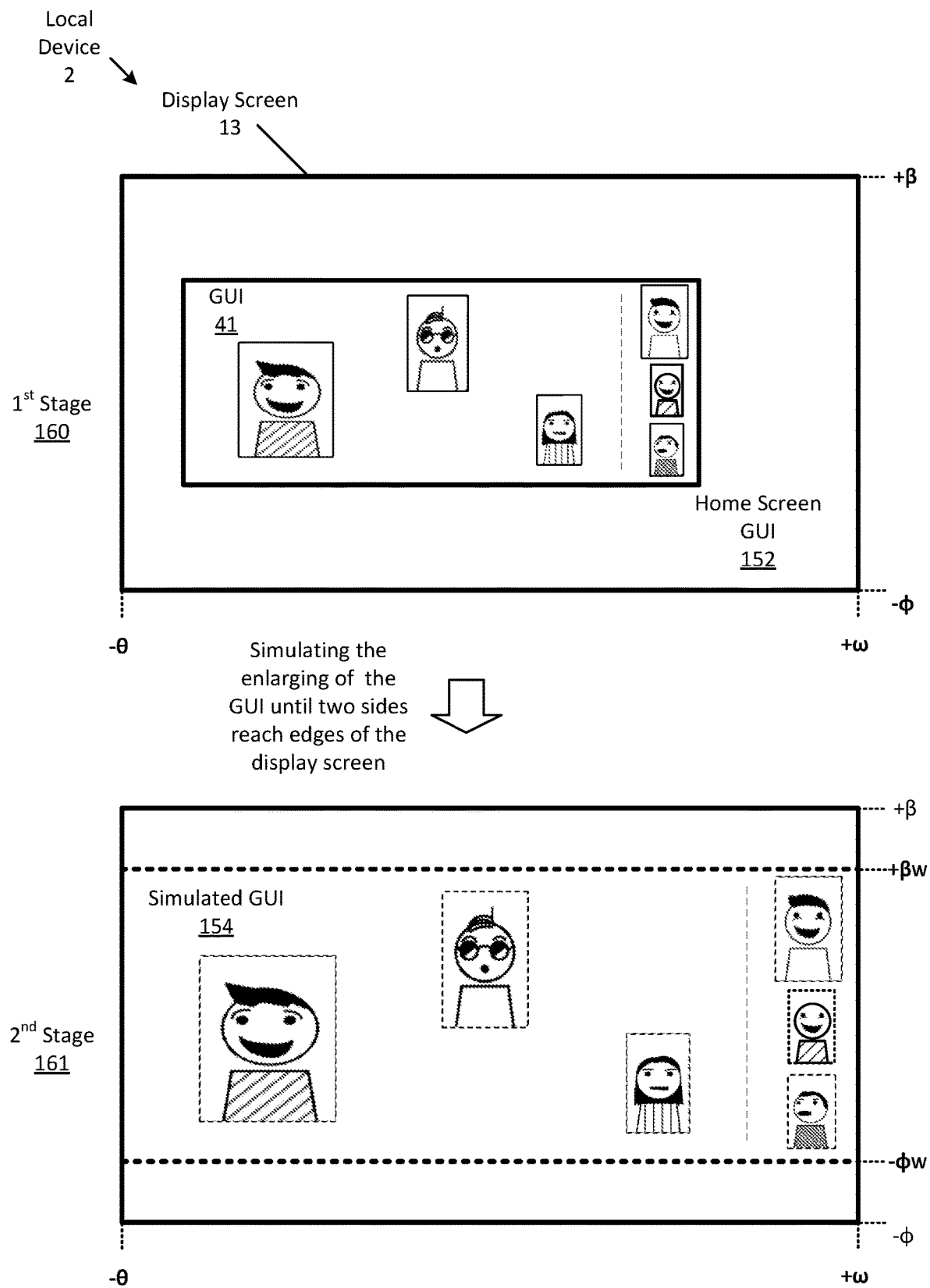

In one aspect, panning ranges may be attached (or correspond to) edges of a display screen, and such panning ranges are then applied to the GUI window within the screen by considering a maximally enlarged version of the GUI window which fills as much of the screen as possible (e.g., where at least two opposite edges of the GUI window are equal to or are adjacent to corresponds edges of the display screen). Such a system has the advantage that the panning ranges are mainly a function of the aspect ratio of the GUI window, and not the GUI's size, thus preserving an audio spatial image that does not change with the GUI size, location, and/or position or collapse if the window is minimized or if the window went into a picture-in-picture mode. FIGS. 14A and 14B show several stages in which panning ranges are based on an aspect ratio of the communication session GUI according to some aspects.

Specifically, as described herein, the local device may define the panning ranges of the one or more speakers based on the aspect ratio of the GUI. For instance, FIG. 14A shows two stages 150 and 151 in which the azimuth panning range is smaller than the total (possible) azimuth panning range of the local device's speakers based on the aspect ratio of the GUI 41. The first stage 150 shows the communication session GUI (while the local device is engaged in a communication session with five remote participants, as described herein) displayed on the display screen 13 of the local device. In particular, the GUI is overlaid on top of a home screen GUI 152 that is displayed on the display screen and provides the local user with an interface to execute and/or terminate one or more computer program applications (which may include the communication session application, as described herein). As shown, the communication session GUI is smaller (or has a smaller surface area) than the homes screen GUI. In one aspect, the local device may receive input (e.g., via any input device, such as a mouse or via the display screen, which may be a touch-sensitive display screen, as described herein) to adjust the size and/or location of the GUI 41 within the home screen GUI 152. As shown, the GUI 41 has a current aspect ratio of 4:3.

In addition, this stage also illustrates the (e.g., azimuth and elevation) panning ranges of the speakers of the local device. As shown, the total panning ranges (e.g., the maximum angles at which virtual sound sources may be positioned when respective input audio streams are spatial rendered using the speakers of the local device) extend to the edges of the display screen. For instance, the speakers' azimuth panning range, $-\theta-+\omega$, spans the total width (along the X-axis) of the display screen 13, and the elevation panning range $-\phi-+\beta$, spans the total height (along the Y-axis) of the display screen 13. Thus, the local device may position virtual sound sources anywhere on (or in front of) the display screen.

The second stage 151 shows the result of simulating the enlarging of the communication session GUI until two sides of the GUI reach respective edges of the display screen. As shown in this figure, the display screen is displaying a simulated GUI 153 that has been enlarged fully in the Y-direction (e.g., visible portions of the session GUI cannot expand more in the Y-direction), whereas the edges along the width of the GUI are separated from the edges of the display screen. Since the height of the session GUI extends the height of the display screen, the elevation panning angles remain the same, whereas, since the width of the session GUI is shorter than the width of the display screen, the azimuth panning range is reduced to $-\theta_w-+\omega_w$, which is less than the total azimuth panning range. Thus, the controller 10 of the local device may define the azimuth and elevation panning ranges accordingly.

FIG. 14B shows two stages 160 and 161 in which the elevation panning range is smaller than the total elevation panning range of the local device's speakers based on the aspect ratio of the GUI 41. This stage is similar to stage 150 of FIG. 14A, except that the aspect ratio of the GUI is 169, rather than 4:3. As a result, converse to the second stage 151, the second stage 161 of this figure shows that the simulated GUI 154 has fully expanded along the width of the display screen 13, but has not fully expanded along the height of the display screen. Thus, when the GUI 41 has a larger aspect ratio, the defined azimuth panning range may equal to the total panning range, whereas the elevation panning range is reduced to $-\phi w-+\beta w$, which is less than the total elevation panning range.

As described thus far, the (controller 10 of the) local device may define panning ranges based on whether the GUI is of a 4:3 or 169 aspect ratio. In another aspect, the panning ranges may be defined for any aspect ratio. In one aspect, the controller may determine and/or adjust spatial parameters of one or more input audio streams based on the aspect ratio or whether the aspect ratio has changed (e.g., in response to user input). More about this is described in FIG. 15.

Figure 15:
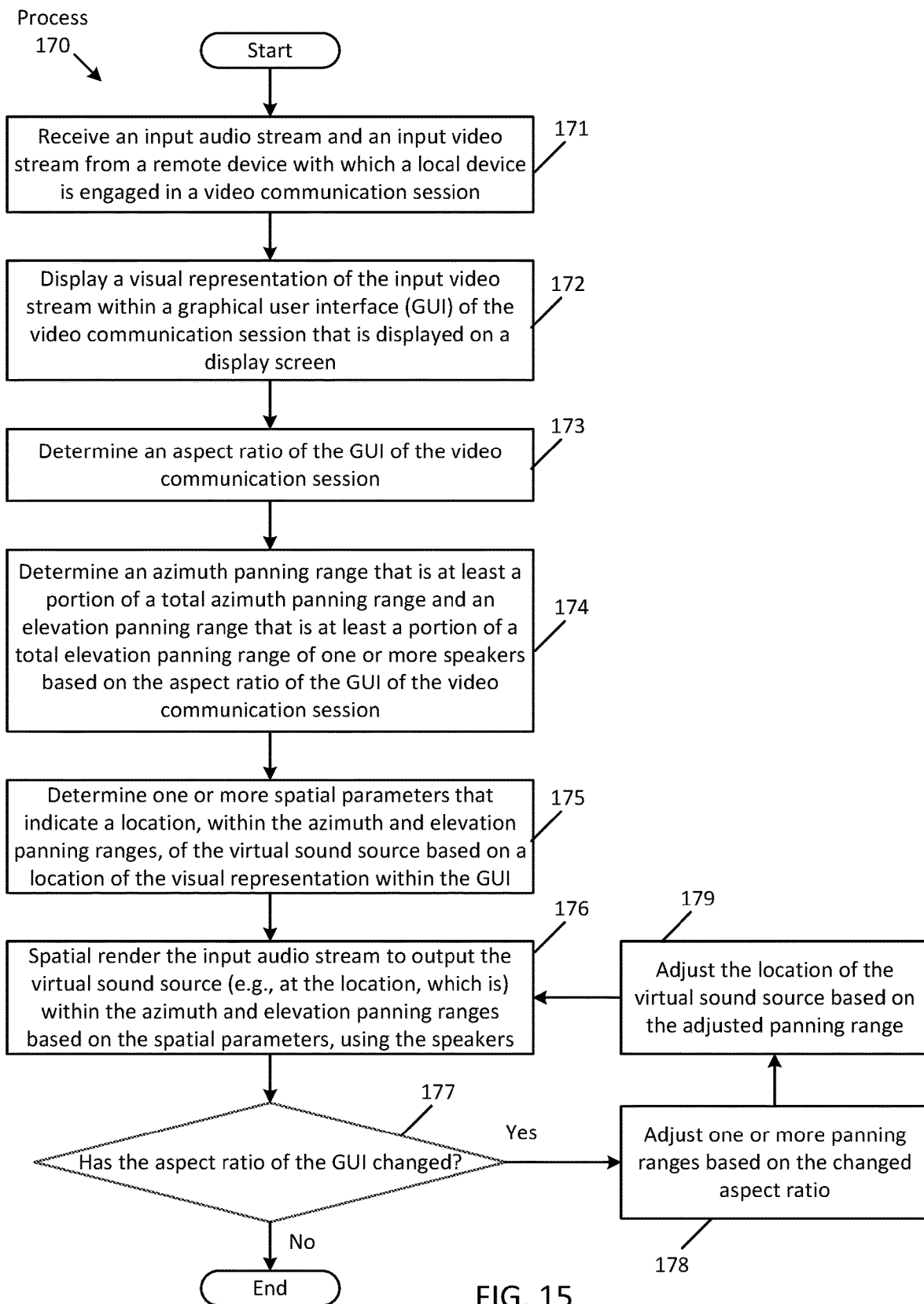
FIG. 15 is a flowchart of one aspect of a process 170 for adjusting the location of one or more virtual sound sources based on a change to an aspect ratio of the GUI of the communication session

FIG. 15 is a flowchart of one aspect of a process 170 for adjusting the location of one or more virtual sound sources based on a change to an aspect ratio of the GUI of the communication session. The process 170 begins by the controller 10 receiving an input audio stream and an input video stream from a remote device with which the local device is engaged in a video communication session (at block 171). In one aspect, the controller may also receive other data (e.g., a VAD signal), as described herein. The controller displays a visual representation of the input video stream within a GUI of the video communication session (having an aspect ratio) that is displayed on the display screen (at block 172). The controller determines an aspect ratio of the GUI of the video communication session (at block 173). Specifically, the video renderer 22 may determine the aspect ratio at which the GUI is being displayed. The controller determines an azimuth panning range that is at least a portion of the total azimuth panning range and an elevation panning range that is at least a portion of the total elevation panning range of the speakers based on the aspect ratio of the GUI (at block 174). Specifically, the controller may perform the operations described in FIGS. 14A and 14B. For instance, the (e.g., video renderer of the) controller may simulate enlarging (or expanding) the GUI, until at least one of a width of the GUI has fully expanded to the width of the display screen or a height of the GUI has fully expanded to the height of the display screen, while maintaining the aspect ratio. In one aspect, this may mean expanding the GUI until at least two sides (or edges) of the GUI come into contact with two comparable sides of the display screen. For example, the renderer may enlarge the GUI until the top and bottom edges of the GUI come into contact with the edges of the display screen (as illustrated in FIG. 14A), or may enlarge the GUI until the side edges of the GUI come into contact with the edges of the display screen (as illustrated in FIG. 14B). Once enlarged, the controller may define the panning ranges based on the size of the simulated GUI with respect to the size of the display screen. In particular, the panning ranges are defined that span the width and height of the GUI with respect to panning ranges as a function of the width and height of the display screen. In one aspect, if the GUI is the same aspect ratio as the display screen, the determined panning ranges may be the total panning ranges of the speakers.

As described herein, when determining the panning ranges when enlarging the GUI, the ranges may span the width and height of the display screen. In another aspect, the panning ranges may extend past the boundaries of the display screen. In which case, the panning ranges may be determined based on the percentage of the enlarged simulated GU. For example, referring to FIG. 14B, the determined azimuth panning ranges may be 100% the total azimuth panning range, since the simulated GUI has expanded to the side edges of the display screen. In contrast, the determined elevation panning ranges may be 70% of the total elevation panning range, since the simulated GUI has only expanded along 70% the total height of the display screen.

The controller determines spatial parameters that indicates a location, within the determined azimuth and elevation panning ranges, of the virtual sound source based on a location of the visual representation within the GUI, as described herein (at block 175). The controller then spatial renders the input audio stream to output the virtual sound source (e.g., at the location, which is) within the azimuth and elevation panning ranges based on the spatial parameters, using the speakers (at block 176). Thus, along with displaying the visual representation, the controller outputs the input audio signal as the virtual sound source at the location within the environment (e.g., in which the local device is located).

The controller determines whether the aspect ratio of the GUI has changed (at decision block 177). In one aspect, this determination may be based on whether user input has been received via one or more input devices to change either a width or a height of the GUI. For example, the controller may receive an indication (e.g., via the video renderer 22) that the user has performed a click-drag operation using a mouse to manually enlarge (or stretch) the GUI in one or more directions (e.g., by selecting one side and performing a dragging motion away from or towards the GUI). In another aspect, when the display screen is a touch-sensitive display screen, the user input may be received when the user performs a touch-drag motion with one or more fingers to adjust the size of the GUI. In some aspects, the controller may perform the operations described in block 173 (e.g., periodically) to determine whether the aspect ratio has changed. In response to determining that the aspect ratio has changed, the controller adjusts one or more panning ranges based on the changed aspect ratio (at block 178). For instance, the controller may perform the operations described in block 174 to determine the changed (or new) azimuth panning range. For instance, when the aspect ratio is increased, the adjusted azimuth panning range may extend a width of the display screen, whereas the adjusted elevation panning range does not fully extend a height of the displays screen, as shown in FIG. 14B. The controller then adjusts the location of the virtual sound source based on the adjusted panning range (at block 179). For instance, the controller may determine the spatial parameters according to any of the methods described herein, and then spatial render the input audio signal according to the new spatial parameters.

In another aspect, the controller may adjust the location based on the changes to the adjusted panning ranges. Specifically, rather than recalculating the locations of the virtual sound sources (e.g. as described in FIG. 9), the controller may adjust the existing locations based on the adjusted panning ranges. For example, increasing the aspect ratio (e.g., from 4:3 to 169), the azimuth panning range may grow (or be increased) from 60% to 100% of the total azimuth panning range and the elevation panning range may lower (or decrease) from 100% to 70%, as illustrated in FIGS. 14A and 14B. In response, the controller may adjust the azimuth angle by the virtual sound source by increasing the angle by 40% and adjust the elevation angle of the virtual sound source by decreasing the angle by 30%. In particular, the controller may increase the azimuth angle, such that the location of the virtual sound source is moved to a wider azimuth position, and may decrease the elevation angle such that the location is moved to a narrower elevation position (e.g., with respect to a 0° reference Z-axis).

In one aspect, determining panning range based on the aspect ratio of the GUI provides consistent spatial audio to the local listener, regardless of the position of the GUI with respect to the display screen. For example, by using the aspect ratio to define the panning range, locations of virtual sound sources are independent of the position, location, and/or size of the GUI that is displayed within the display screen. Thus, the local user may move the GUI throughout the display screen, without adversely affecting the spatial cues of the remote participants while engaged in the communication session. In addition, the spatial cues (e.g., the locations of virtual sound sources) are also independent of a position and/or orientation of the display screen, which may be different between different users.

In one aspect, the panning ranges may extend beyond the edges of the display screen. In which case, the panning ranges may be a function of a size of the simulated enlarged GUI with respect to a size of the display screen (or rather the area of the display screen which displays video data). Thus, when in a lower aspect ratio, as illustrated in FIG. 14A, the controller may take advantage of the full azimuth panning range in order to spatial render virtual sound sources, while only using a portion of the full elevation panning range (e.g., which may be based on the difference between the height of the enlarged GUI and the height of the displayable area of the display screen, as described herein.

Some aspects may perform variations to the processes 30, 90, 80, 140, and 170 described in FIGS. 5, 6, 9, 13, and 15, respectively. For example, the specific operations of at least some of the processes may not be performed in the exact order shown and described. The specific operations may not be performed in one continuous series of operations and different specific operations may be performed in different aspects.

As described thus far, the one or more speakers that output the one or more virtual sound sources may be arranged to output sound into the ambient environment, such as being extra-aural speakers that may be integrated into the local device, the display screen, or any electronic device, as described herein. In another aspect, the speakers may be a part of a headset, such as the headset 6 of FIG. 1. In which case, the controller may perform similar operations as described herein to determine spatial parameters and to use the data to spatial render one or more input audio streams. In one aspect, however, the controller may define the one or more panning ranges differently. For example, the azimuth panning range and the elevation panning range may extend 360° around the local user. As a result, virtual sound sources may be positioned anywhere within the sound field. In another aspect, extra-aural speakers of the system 1 may have a similar panning range.

As described thus far, the controller 10 determines various parameters and data for spatial rendering input audio streams, such as: one or more azimuth panning ranges and one or more elevation panning ranges (e.g., one group of ranges while the local device is in a portrait orientation and one group of ranges while the local device is in a landscape orientation), one or more panning angles per input audio stream, distance (e.g., between the local user and virtual sound sources, between the local user and the display screen, etc.), reverb, device orientation, GUI dimensions (e.g., size, shape, position, and aspect ratio), and dimensions of the display screen (e.g., width, height, and aspect ratio). In another aspect, this data may also include predefined data, such as predefined dimensions of the GUI, predefined distance between the display screen and a reference point, etc. In one aspect, any of these parameters or values may be changed by the local user. For instance, the local device may display a menu (e.g. based on a user selection of a UI within the communication session GUI). Once displayed, the user may adjust any of the parameters or values. For example, the user may adjust panning ranges based on certain circumstances. In particular, the user may want to reduce panning ranges to be bounded by the display screen, rather than extending beyond the display screen (e.g., in order to minimize sound leakage within the acoustic environment).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

In one aspect, at least one visual representation of a respective input video stream associated with an individually rendered input audio stream has a size that is greater than sizes of visual representations of input video streams that are associated with input audio streams of a mix of input audio streams, wherein all visual representations of respective input video streams associated with all input audio streams that are rendered as the mix have a same size. In other words, roster visual representations may have all the same size. In one aspect, an arrangement of locations for the individual virtual sound sources are in front of the display screen of the local device based on the communication session parameters. In some aspects, the arrangement of locations for the individual virtual sound sources comprises are determined by, for each individual virtual sound source, determining, using the set of communication session parameters, a location within the GUI of the visual representation of a respective input video stream that is associated with a respective input audio stream that is to be spatial rendered as an individual virtual sound source; and determining one or more spatial parameters that indicates a location of the individual virtual sound source within the arrangement based on the determined location of the visual representation, wherein spatial rendering the input audio stream as the individual virtual sound source comprises using the determined spatial data to spatial render the input audio stream as the individual virtual sound source at the location. In one aspect, the spatial parameters comprises an azimuth angle along a first axis between the location of the individual virtual sound source and a second axis and an elevation angle along a third axis between the location of the individual virtual sound source and the second axis. In some aspects, the arrangement also includes a location of the single virtual sound source, wherein determining the locations further comprises for each input audio stream of the mix, determining, using the set of communication session parameters, a location within the GUI of the visual representation of a respective input video stream that is associated with the input audio stream of the mix; determining spatial parameters that indicates a location of a virtual sound source of the input audio stream based on the determined location; and determining new spatial parameters that indicates a particular location based on at least some of the spatial parameters, wherein spatial rendering the mix of input audio streams comprises using the new spatial parameters to spatial render the mix of input audio stream as the single virtual sound source at the particular location. In some aspects, the new spatial parameters are determined by determining a weighted combination of the spatial parameters of all input audio streams of the mix, wherein the particular location is at a different location than the locations of the virtual sound sources of the input audio streams of the mix.

In one aspect, visual representations of input video streams that are associated with input audio streams of the mix of input audio streams are arranged in a row or a column based on an orientation of the local device, wherein the different location is at a center of the row or the column on the display screen.

According to one aspect of the disclosure, the (e.g., controller 10 of the) local device 2 may perform a method that includes one or more operations, such as receiving, for each of a first plurality of remote devices that are engaged in a video communication session with the local device, an input audio stream and an input video stream; displaying, for each input video stream, a visual representation of the input video stream in a graphical user interface (GUI) on the display screen; for at least one input audio stream, spatial rendering the input audio stream to output an individual virtual sound source that includes only the input audio stream via the plurality of speakers; in response to determining that a second plurality of remote devices have joined the video communication session, receiving, for each of the second plurality of remote devices, an input audio stream and an input video stream; determining whether the local device supports additional individual virtual sound sources for one or more input audio streams of the second plurality of remote devices; in response to determining that the local device does not support additional individual virtual sound sources defining a plurality of user interface (UI) zones located in the GUI, each UI zone including one or more visual representations of one or more input video streams of either the first plurality of remote devices, the second plurality of remote devices, or a combination thereof that are displayed in the UI zone; and for each UI zone, spatial rendering a mix of one or more input audio streams that are associated with the one or more visual representations that are included within the UI zone as a virtual sound source by the plurality of speakers.

In one aspect, the local device is configured to spatial render a predefined number of input audio streams as individual virtual sound sources, wherein determining whether the local device supports additional individual virtual sound sources comprises determining whether a number of input audio streams of the first and second plurality of remote devices that are determined to be individually spatial rendered is greater than the predefined number. In another aspect, a number of defined UI zones does not exceed the predefined number of input audio streams that may be spatial rendered as individual virtual sound sources. In one aspect, defining the plurality of UI zones comprises: displaying all of the visual representations associated with the first and second plurality of remote devices in a grid; and establishing a virtual grid of UI zones on the GUI, where each UI zone encompasses one or more visual representations. In some aspects, establishing the virtual grid of UI zones comprises assigning one or more adjacent visual representations to each UI zone.

In one aspect, defining the plurality of UI zones comprises determining a number of input audio streams that are received from the first and second plurality of remote devices, wherein a number of the plurality of UI zones are defined based on the number of input audio streams. In one aspect, input audio streams of the first and second plurality of remote devices are evenly distributed amongst the plurality of UI zones. In some aspects, the method further comprises: in response to determining that a third plurality of remote devices have joined the video communication session, receiving, for each of the third plurality of remote devices, an input audio stream and an input video stream;

and redefining the plurality of UI zones by 1) adding visual representations of input video streams from the third plurality of remote devices into already defined UI zones, 2) creating one or more new UI zones, or 3) a combination thereof. In one aspect, for each UI zone, a respective UI zone virtual sound source is at a location on the UI zone displayed on the display screen. In some aspects, the location is at a center of the UI zone. In another aspect, the location is on a visual representation associated with an input audio stream of the mix of one or more input audio streams that has a signal energy level that is above a threshold.

According to one aspect of the disclosure, the (controller 10 of the) local device 2 may perform a method that includes one or more operations, such as receiving an input audio stream from a remote device with which the local device is engaged in a communication session; determining a first orientation of the local device; determining a panning range of the plurality of speakers for the first orientation of the local device that spans along a horizontal axis; spatial rendering the input audio stream as a virtual sound source at a location along the horizontal axis and within the panning range using the plurality of speakers; in response to determining that the local device is in a second orientation, determining an adjusted panning range of the plurality of speakers that spans wider along the horizontal axis than the panning range; and adjusting the location of the virtual sound source along the horizontal axis based on the adjusted panning range.

In one aspect, the first orientation is a portrait orientation of the local device and the second orientation is a landscape orientation. In another aspect, the location of the virtual sound source is adjusted proportionally along the horizontal axis with respect to the adjusted panning range. In one aspect, the panning range is a horizontal panning range and the adjusted panning range is an adjusted horizontal panning range, wherein method further comprises determining, while the local device is orientated in the first orientation, a vertical panning range of the plurality of speakers that spans along a vertical axis along which the location of the virtual sound source is located; in response to determining that the local device has orientated into the second orientation, determining an adjusted vertical panning range of the plurality of speakers that spans along the vertical axis that is smaller than the vertical panning range; and adjusting the location of the virtual sound source along the vertical axis based on the adjusted vertical panning range and along the horizontal axis based on the adjusted horizontal panning range.

In one aspect, the method further comprising receiving, from the remote device, the input audio stream and an input video stream for display as a visual representation in a graphical user interface (GUI) on a display screen of the local device. In some aspects, while in the first orientation, the location along the horizontal axis at which the virtual sound source is located is a same location at which the visual representation is displayed with respect to the display screen; and in response to determining that the local device has orientated into the second orientation, maintaining the location of the visual representation with respect to the display screen while adjusting the location of the virtual sound source such that the virtual sound source and the visual representation remain at the same location with respect to the display screen. In one aspect, the method further comprising: receiving, from each of a plurality of remote devices with which the local device is engaged in the communication session, an individual input audio stream; and spatial rendering a mix of the individual input audio streams as a single virtual sound source that contains the mix of individual input audio streams a mix of input audio streams. In another aspect, the method further comprising: receiving a plurality of input video streams, each from a different remote device of the plurality of remote devices; while the local device is in the first orientation, displaying a plurality of visual representations, each for a different input video stream of the plurality of input video streams, in a row along the horizontal axis within a graphical user interface (GUI) on a display screen of the local device, wherein the single virtual sound source is rendered at a location of one of the visual representations. In one aspect, the single virtual sound source is rendered at the location of the one of the visual representations in response to the individual input audio stream associated with the input video stream displayed in the one of the visual representations having an energy level that is greater than a remainder of individual input audio streams in the mix of individual input audio streams. In some aspects, the location at which the single virtual sound source is rendered changes along the horizontal axis but does not change along a vertical axis based on which individual audio stream associated with a respective visual representation of the row has a greater energy level. In another aspect, the method further comprising, in response to determining that the local device has orientated into the second orientation, displaying the plurality of visual representations in a column along a vertical axis within the GUI on the display screen of the local device; and adjusting the single virtual sound source to continue to render the signal virtual sound source at the location of the one of the visual representations within the column. In some aspects, the location at which the signal virtual sound source is rendered changes along the vertical axis but does not change along the horizontal axis based on which individual audio stream associated with a respective visual representation of the column has a greater energy level than a remainder of the individual audio streams.

In one aspect, prior to determining that the local device has orientated into the second orientation, the method further comprises determining spatial data, with which the input audio stream is spatial rendered, which indicates the location of the individual virtual sound source as an angle between a reference point and the location along the horizontal axis. In another aspect, adjusting the location of the virtual sound source comprises determining adjusted spatial data which indicates the adjusted location as an adjusted angle between the reference point and the adjusted location along the horizontal axis and within the adjusted panning range; and using the adjusted spatial data to spatial render the input audio stream as the virtual sound source at the adjusted location.

According to another aspect, the (e.g., controller 10 of the) local device 2 may perform a method that includes one or more operations, such as receiving an input audio stream and an input video stream from a remote device with which the local device is engaged in a video communication session; displaying a visual representation of the input video stream within a graphical user interface (GUI) of the video communication session that is displayed on a display screen; determining an aspect ratio of the GUI of the video communication session; determining an azimuth panning range that is at least a portion of a total azimuth panning range of a plurality of speakers and an elevation panning range that is at least a portion of a total elevation panning range of the plurality of speakers based on the aspect ratio of the GUI of the video communication session; and spatial rendering the input audio stream to output a virtual sound source that includes the input audio stream within the azimuth and elevation panning ranges using the plurality of speakers.

In another aspect, the GUI of the video communication session is smaller than the display screen on which it is displayed, wherein the azimuth and elevation panning ranges are independent of a location of the GUI within the display screen. In one aspect, the azimuth and elevation panning ranges are independent of a position and an orientation of the display screen. In some aspects, the display screen is integrated within the local device, wherein the total azimuth panning range spans a width of the display screen and the total elevation panning range spans a height of the display screen. In another aspect, determining the azimuth and elevation panning ranges comprises expanding the GUI of the video communication session until one of a width of the GUI has fully expanded to the width of the display screen or a height of the GUI has fully expanded to the height of the display screen, while maintaining the aspect ratio; and defining the azimuth panning range to span the width of the GUI and defining the elevation panning range to span the height of the GUI. In another aspect, when the width of the GUI is the width of the display screen, the azimuth panning range is the total azimuth panning range, and the elevation panning range is less than the total elevation panning range, when the height of the GUI is the height of the display screen, the azimuth panning range is less than the total azimuth panning range, and the elevation panning range is the total elevation panning range.

In one aspect, the method further comprises determining spatial parameter that indicates a location within the azimuth and elevation panning ranges of the virtual sound source based on a location of the visual representation within the GUI, wherein the input audio stream is spatial rendered using the spatial parameter. In some aspects, the spatial parameter comprises an azimuth angle along the azimuth panning range and an elevation angle along the elevation panning range with respect to a reference point in front of the display screen. In one aspect, the method further comprising: determining that the aspect ratio of the GUI has changed; adjusting at least one of the azimuth panning range and the elevation panning range based on the changed aspect ratio; adjusting the spatial parameter such that the location of the is within the adjusted at least one of azimuth panning range and the elevation panning range; and spatial rendering the input audio stream using the adjusted spatial parameter.

In some aspects, determining the spatial parameter comprises: determining the azimuth angle for the virtual sound source using an x-coordinate of a location of a center point of the visual representation within the GUI as input to a first linear function of the azimuth panning range; determining the elevation angle for the virtual sound source using a y-coordinate of the location of the center point of the visual representation within the GUI as input to a second linear function of the elevation panning range; and spatial rendering the input audio stream according to the azimuth angle and the elevation angle to output the virtual sound source. In another aspect, determining the spatial parameter comprises: estimating an azimuth viewing range of the GUI with a predefined width and an elevation viewing range of the GUI with a predefined height, determining a reference point that is at a predefined distance from a front of the display screen on which the GUI is displayed; determining a viewing azimuth angle from the visual representation on the GUI to the reference point and a viewing elevation angle from the visual representation on the GUI to the reference point; determining the azimuth angle for the virtual sound source using the viewing azimuth angle as input into a first linear function of the azimuth panning range with respect to the estimated azimuth viewing range; and determining the elevation angle for the virtual sound source using the viewing elevation angle as input into a second linear function of the elevation panning range with respect to the estimated elevation viewing range.

In one aspect, the location includes an azimuth angle and an elevation angle with respect to a reference point in front of the local device, wherein the adjusted location has a lower azimuth angle and a higher elevation angle in response to determining that the aspect ratio has decreased. In another aspect, while the GUI has the decreased aspect ratio, the lower azimuth angle is an angle within an azimuth panning range of the plurality of speakers that does not fully extend a width of the display screen and the higher elevation angle is an angle within an elevation panning range of the plurality of speakers that extends a height of the display screen.

As previously explained, an aspect of the disclosure may be a non-transitory machine-readable medium (such as microelectronic memory) having stored thereon instructions, which program one or more data processing components (generically referred to here as a "processor") to perform the network operations and audio signal processing operations, as described herein. In other aspects, some of these operations might be performed by specific hardware components that contain hardwired logic. Those operations might alternatively be performed by any combination of programmed data processing components and fixed hardwired circuit components. In one aspect, the operations of the methods described herein may be performed by the local device when the one or more processors execute instructions stored within the non-transitory machine-readable medium.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A method performed by a programmed processor of a local device, the method comprising:
   outputting, using a plurality of speakers, an input audio stream from a remote device with which the local device is engaged in a communication session as a virtual sound source at a location with respect to a reference point that is off of the local device; and
   in response to an orientation of the local device changing to a new orientation, adjusting the location of the virtual sound source along a horizontal axis with respect to the reference point.

2. The method of claim 1, wherein adjusting the location of the virtual sound source comprises changing an azimuth angle associated with the location, wherein the azimuth angle is an angle along the horizontal axis with respect to the reference point.

3. The method of claim 2, wherein the azimuth angle is within a first azimuth panning range of the plurality of speakers while the local device is within the orientation and the changed azimuth angle is within a second azimuth panning range of the plurality of speakers that is greater than the first azimuth panning range while the local device is in the new orientation, wherein the azimuth angle is proportionally greater than the changed azimuth angle with respect to a difference between the first and second azimuth panning ranges.

4. The method of claim 1 further comprising, in response to the orientation of the local device changing to the new orientation, adjusting the location of the virtual sound source along a vertical axis by changing an elevation angle associated with the location, wherein the elevation angle is an angle along the vertical axis with respect to the reference point.

5. The method of claim 1, wherein the orientation is a portrait orientation and the new orientation is a landscape orientation.

6. The method of claim 1 further comprising, in response to the new orientation of the local device changing back to the orientation, adjusting the location of the virtual sound source along the horizontal axis back to the location with respect to the reference point.

7. The method of claim 1 further comprising
receiving, from the remote device, the input audio stream and an input video stream; and
displaying a visual representation of the input video stream in a graphical user interface GUI) of the communication session on a display of the local device.

8. A first electronic device, comprising:
a plurality of speakers;
at least one processor; and
memory having instructions stored therein which when executed by the at least one processor causes the first electronic device to:
output, using the plurality of speakers, an input audio stream from a second electronic device with which the first electronic device is engaged in a communication session as a virtual sound source at a location with respect to a reference point that is off of the first electronic device; and
in response to an orientation of the first electronic device changing to a new orientation, adjusting the location of the virtual sound source along a horizontal axis with respect to the reference point.

9. The first electronic device of claim 8, wherein the instructions to adjust the location of the virtual sound source comprises instructions to change an azimuth angle associated with the location, wherein the azimuth angle is an angle along the horizontal axis with respect to the reference point.

10. The first electronic device of claim 9, wherein the azimuth angle is within a first azimuth panning range of the plurality of speakers while the first electronic device is within the orientation and the changed azimuth angle is within a second azimuth panning range of the plurality of speakers that is greater than the first azimuth panning range while the first electronic device is in the new orientation, wherein the azimuth angle is proportionally greater than the changed azimuth angle with respect to a difference between the first and second azimuth panning ranges.

11. The first electronic device of claim 8, wherein the memory has further instructions to, in response to the orientation of the first electronic device changing to the new orientation, adjust the location of the virtual sound source along a vertical axis by changing an elevation angle associated with the location, wherein the elevation angle is an angle along the vertical axis with respect to the reference point.

12. The first electronic device of claim 8, wherein the orientation is a portrait orientation and the new orientation is a landscape orientation.

13. The first electronic device of claim 8, wherein the memory has further instructions to, in response to the new orientation of the first electronic device changing back to the orientation, adjusting the location of the virtual sound source along the horizontal axis back to the location with respect to the reference point.

14. The first electronic device of claim 8 is a handheld device.

15. The first electronic device of claim 8 further comprising a display, wherein the memory has further instructions to:
receive, from the second electronic device, the input audio stream and an input video stream; and
display a visual representation of the input video stream in a graphical user interface GUI) of the communication session on the display.

16. An application in a non-transitory machine-readable medium configured to be executed on a first electronic device, the application operative to:
output, using a plurality of speakers, an input audio stream from a second electronic device with which the first electronic device is engaged in a communication session as a virtual sound source at a location with respect to a reference point that is off of the first electronic device; and
in response to an orientation of the first electronic device changing to a new orientation, adjust the location of the virtual sound source along a horizontal axis with respect to the reference point.

17. The application of claim 16, wherein adjusting the location of the virtual sound source comprises changing an azimuth angle associated with the location, wherein the azimuth angle is an angle along the horizontal axis with respect to the reference point.

18. The application of claim 17, wherein the azimuth angle is within a first azimuth panning range of the plurality of speakers while the first electronic device is within the orientation and the changed azimuth angle is within a second azimuth panning range of the plurality of speakers that is greater than the first azimuth panning range while the first electronic device is in the new orientation, wherein the azimuth angle is proportionally greater than the changed azimuth angle with respect to a difference between the first and second azimuth panning ranges.

19. The application of claim 16, wherein the application is operative to, in response to the orientation of the first electronic device changing to the new orientation, adjust the location of the virtual sound source along a vertical axis by changing an elevation angle associated with the location, wherein the elevation angle is an angle along the vertical axis with respect to the reference point.

20. The application of claim 16, wherein the orientation is a portrait orientation, and the new orientation is a landscape orientation.

21. The application of claim 16, wherein the application is operative to, in response to the new orientation of the first electronic device changing back to the orientation, adjusting the location of the virtual sound source along the horizontal axis back to the location with respect to the reference point.

22. The application of claim 16, where the application is operative to:
- receive, from the second electronic device, the input audio stream and an input video stream; and
- display a visual representation of the input video stream in a graphical user interface GUI) of the communication session on a display of the first electronic device.

* * * * *